US012069463B2

(12) United States Patent
Brimijoin, II et al.

(10) Patent No.: US 12,069,463 B2
(45) Date of Patent: *Aug. 20, 2024

(54) DYNAMIC TIME AND LEVEL DIFFERENCE RENDERING FOR AUDIO SPATIALIZATION

(71) Applicant: Meta Platforms Technologies, LLC, Menlo Park, CA (US)

(72) Inventors: William Owen Brimijoin, II, Kirkland, WA (US); Samuel Clapp, Seattle, WA (US); Peter Harty Dodds, Seattle, WA (US); Nava K. Balsam, Woodinville, WA (US); Tomasz Rudzki, York (GB); Ryan Rohrer, Seattle, WA (US); Kevin Scheumann, Kirkland, WA (US); Michaela Warnecke, Somerville, MA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/892,310

(22) Filed: Aug. 22, 2022

(65) Prior Publication Data

US 2022/0394405 A1 Dec. 8, 2022

Related U.S. Application Data

(63) Continuation of application No. 17/379,730, filed on Jul. 19, 2021, now Pat. No. 11,457,325.

(Continued)

(51) Int. Cl.
*H04S 1/00* (2006.01)

(52) U.S. Cl.
CPC .......... *H04S 1/005* (2013.01); *H04S 2420/01* (2013.01)

(58) Field of Classification Search
CPC ...... H04S 1/005; H04S 2420/01; H04S 7/304; H04S 2400/11; H04S 2400/01

(Continued)

(56) References Cited

U.S. PATENT DOCUMENTS

| | | |
|---|---|---|
| 10,028,070 B1 | 7/2018 | Gamper et al. |
| 10,397,724 B2 | 8/2019 | Celestinos et al. |

(Continued)

OTHER PUBLICATIONS

Non-Final Office Action mailed Dec. 6, 2022 for U.S. Appl. No. 17/498,554, filed Oct. 11, 2021, 15 pages.

(Continued)

*Primary Examiner* — Paul Kim
(74) *Attorney, Agent, or Firm* — Weaver Austin Villeneuve & Sampson LLP

(57) ABSTRACT

A system is disclosed for using an audio time and level difference renderer (TLDR) to generate spatialized audio content for multiple channels from an audio signal received at a single channel. The system selects an audio TLDR from a set of audio TLDRs based on received input parameters. The system configures the selected audio TLDR based on received input parameters using a filter parameter model to generate a configured audio TLDR that comprises a set of configured binaural dynamic filters, and a configured delay between the multiple channel. The system applies the configured audio TLDR to an audio signal received at the single channel to generate spatialized multiple channel audio content for each channel of the multiple audio channel and presents the generated spatialized audio content at multiple channels to a user via a headset.

20 Claims, 11 Drawing Sheets

Related U.S. Application Data

(60) Provisional application No. 63/176,595, filed on Apr. 19, 2021, provisional application No. 63/054,055, filed on Jul. 20, 2020.

(58) Field of Classification Search
USPC .......................................................... 381/309
See application file for complete search history.

(56) References Cited

U.S. PATENT DOCUMENTS

| | | | |
|---|---|---|---|
| 10,999,690 | B2 | 5/2021 | Ithapu et al. |
| 2013/0041648 | A1 | 2/2013 | Osman |
| 2017/0045941 | A1 | 2/2017 | Tokubo et al. |
| 2018/0035226 | A1 | 2/2018 | Reijniers et al. |
| 2020/0275232 | A1 | 8/2020 | Villanueva-Barreiro |
| 2021/0400414 | A1* | 12/2021 | Tu ........................... H04S 7/304 |
| 2022/0225050 | A1 | 7/2022 | Ninan et al. |

OTHER PUBLICATIONS

Final Office Action mailed Apr. 28, 2023 for U.S. Appl. No. 17/498,554, filed Oct. 11, 2021, 13 pages.

* cited by examiner

405

500

DYNAMIC TIME AND LEVEL DIFFERENCE RENDERING FOR AUDIO SPATIALIZATION

CROSS-REFERENCE TO RELATED APPLICATIONS

This application is a continuation of U.S. patent application Ser. No. 17/379,730, filed Jul. 19, 2021, which claims the benefit of U.S. Provisional Application No. 63/054,055, filed Jul. 20, 2020, and U.S. Provisional Application No. 63/176,595, filed Apr. 19, 2021, both of which are incorporated by reference in their entirety.

FIELD OF THE INVENTION

The present disclosure generally relates to spatializing audio content, and specifically relates to a dynamic time and level difference rendering for audio spatialization.

BACKGROUND

Conventional audio systems use frequency-domain multiplication to process head-related transfer functions (HRTFs) for the generation of spatialized audio content. However, time-domain convolution of HRTFs require significant computational resources, power, and memory. This makes these devices not ideal for use in resource-constrained devices, such as a headset, with limited compute resources, limited memory, limited power, and small form factors.

SUMMARY

An audio system is described herein that includes parametric specification of a set of infinite impulse response for generating spatialized audio content. The audio system may be part of a headset. In some embodiments, the headset may be an artificial reality headset (e.g., presents content in virtual reality, augmented reality, and/or mixed reality). The system may use one or more input parameters to select an audio time and level difference renderer (TLDR) and a set of parameters for this TLDR. A selected audio TLDR may include static audio filters and dynamic audio filters that are configured based on a model to approximate a given head-related transfer function (HRTFs). The selected and configured audio TLDR is applied to an audio input signal arriving at a single channel (e.g., mono-channel) for generating spatialized audio content for multiple channels.

In some embodiments a method is described. An audio time and level difference renderer (TLDR) is configured based on one or more received input parameters using a filter parameter model that includes a set of configured binaural dynamic filters. The binaural dynamic filters in the set are coupled via multiple channels for receiving input audio signals that are spilt from a single channel. The configured audio TLDR is applied to an audio signal to generate spatialized audio content for each channel of the multiple channels. The generated spatialized audio content is presented via multiple channels to a user.

In some embodiments an audio controller is described. The audio controller may configure an audio time and level difference renderer (TLDR) based on one or more received input parameters using a filter parameter model that includes a set of configured binaural dynamic filters. The binaural dynamic filters in the set are coupled via multiple channels for receiving input audio signals that are spilt from a single channel. The audio controller may be configured to apply the configured audio TLDR to an audio signal to generate spatialized audio content for each channel of the multiple channels. A transducer array may be configured to present the generated spatialized audio content via multiple channels to a user.

In some embodiments, a non-transitory computer-readable medium is described. The non-transitory computer-readable medium comprising stored instructions, the instructions when executed by a processor of a device, causing the device to configure an audio time and level difference renderer (TLDR) based on one or more received input parameters using a filter parameter model that includes a set of configured binaural dynamic filters. The binaural dynamic filters in the set are coupled via multiple channels for receiving input audio signals that are spilt from a single channel. The instructions when executed by the processor further cause the device to apply the configured audio TLDR to an audio signal to generate spatialized audio content for each channel of the multiple channels. The generated spatialized audio content may be presented via multiple channels to a user

Figure 1:
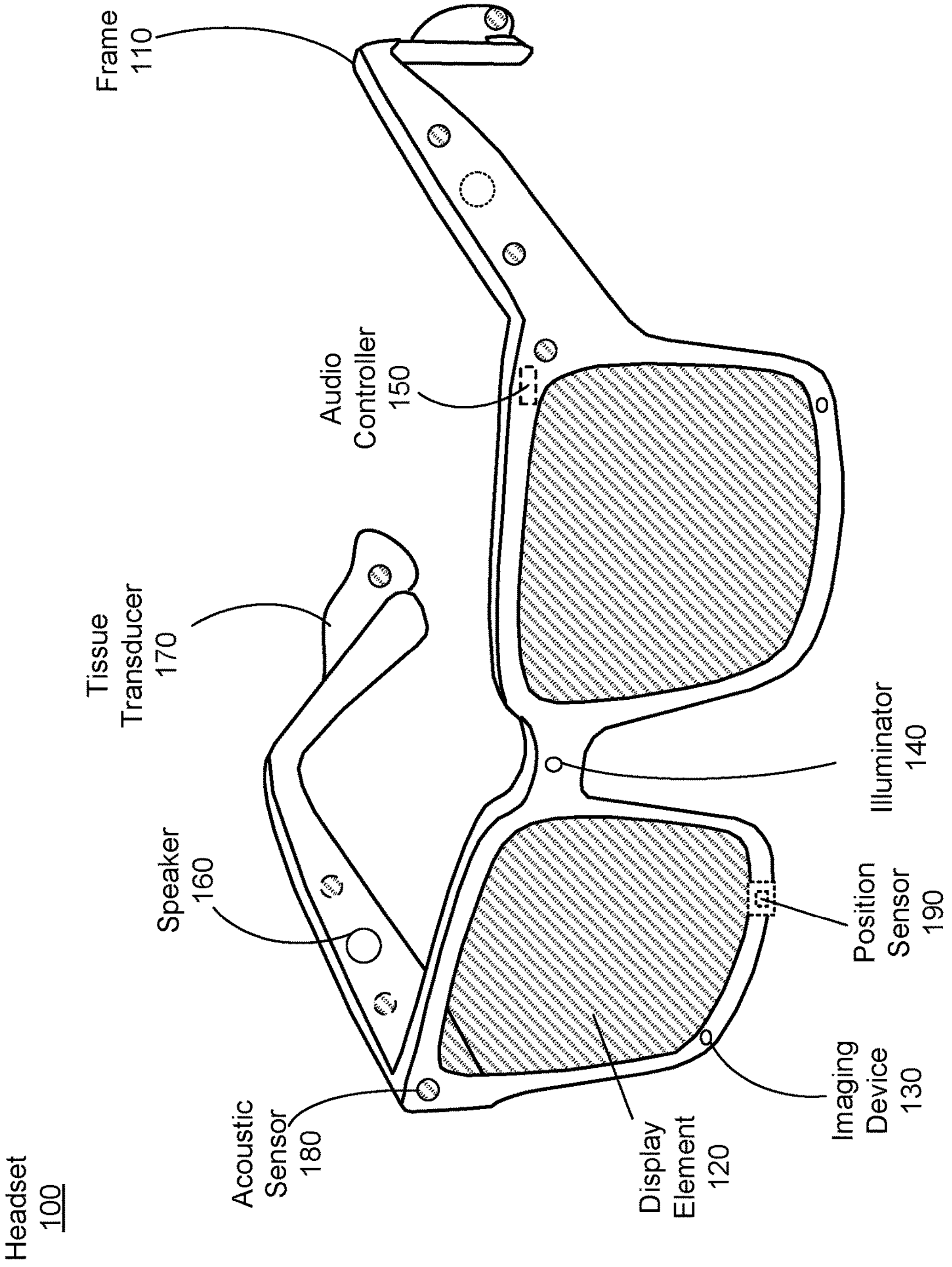
FIG. 1 is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

An audio system is described herein that includes parametric selection, configuration, and application of an appropriate audio time and level difference renderer (TLDR) for generating spatialized audio content. The spatialized audio content may be provided to a user through a headset. The audio system may be part of the headset. In some embodiments, the headset may be an artificial reality headset (e.g., presents content in virtual reality, augmented reality, and/or mixed reality). Spatialized audio content is audio content that appears to originate from a particular direction and/or target region (e.g., an object in the local area and/or a virtual object). The system may use a target sound source angle and a target fidelity of audio rendering to select an audio TLDR from a set of possible audio TLDRs for generating multi-channel spatialized audio content from a mono-channel audio signal. The selected audio TLDR may be configured to use static audio filters, dynamic audio filters, delays, or some combination thereof, to simulate applying one or more head-related transfer functions (HRTFs) of a user of the audio system to the audio signal and thereby generate multi-channel spatialized audio content from an input mono-channel audio signal.

The parametric audio TLDR approach described in embodiments herein selects and configures an audio TLDR to approximate a given HRTF. The selected and configured audio TLDR includes a cascaded series of infinite impulse response (IIR) filters and a pair of delays. Subsequent to configuration, the audio TLDR is applied to an audio signal received at a single channel to generate spatialized audio content corresponding to multiple channels (e.g., left and right channel audio signals). The selected and configured audio TLDR may have a set of configured monaural static filters (with 0, 1, 2, . . . number of monaural static filters in the set) and a set of configured monaural dynamic filters (with 0, 1, 2, . . . number of monaural dynamic filters in the set) connected to the set of monaural static filters. The monaural static and dynamic filters are connected (i.e., receive input audio signal and generate an output audio signal) through the single channel. In some embodiments, there may also be static binaural filters that may perform individualized left/right speaker equalization. The selected and configured audio TLDR also has a set of configured binaural dynamic filters (with 1, 2, . . . , number of pairs of binaural dynamic filters in the set) that are connected (i.e., receive an input audio signal and generate an output audio signal) through each channel of multiple audio channels (such as a connected left channel and a connected right channel). In addition, the selected and configured audio TLDR may have a configured delay between the multiple audio channels.

In embodiments described herein, selecting and configuring a particular audio TLDR involves selecting and configuring the filters in each of the sets of monaural static filters, monaural dynamic filters, and binaural dynamic filters in the particular audio TLDR. The selection and configuration of the filters is based on input parameters. The input parameters that are used for selecting a particular audio TLDR may include any of: target power consumption desired of the audio TLDR, a target compute load specification in association with the selected audio TLDR, and target memory footprint in association with the selected audio TLDR. Input parameters that are used for configuring a selected audio TLDR may include any of: a target sound source angle, target sound source distance, and target audio fidelity of audio rendering. The target sound source angle describes the angular location, relative to the user, where a virtual sound source may be located. In some embodiments, the target sound source angle may be described by both an azimuth parameter value and an elevation parameter value. In some embodiments, the target sound source angle may be described as any one of an azimuth parameter value or an elevation parameter value. In some embodiments, the target sound source angle may be defined in degrees, and a coordinate system may be defined as follows: an azimuth parameter value of 0° is defined as straight ahead relative to the user's head, negative values are to the left of the user's head, and positive values are to the right of the user's head; an elevation parameter value of 0° is defined as level with the user's head, negative values are below the user's head, and positive values are above the user's head.

There are several advantages to using a parametric audio TLDR approach in generating spatialized audio content. One advantage is efficiency in compute and memory, since the computational complexity in using the cascaded series of infinite impulse response (IIR) filters may be lower than an equivalent impulse response convolution in the time domain (such as would occur with the use of finite impulse response filters), and is one to two orders of magnitude smaller in memory footprint. The reduced complexity of the approach makes embodiments described herein implementable even in hardware offering low computational and memory resources. Another advantage of the approach is that, by using IIR filters, the approximated HRTFs can be interpolated, individualized, and manipulated in real time. Moving a notch in a time-domain impulse response is fraught with problems, while, in a parametric framework, the center frequency of a filter may be easily adjusted (e.g., by just modifying parameters in a model, such as modifying values in a look-up table). This allows increased flexibility for individualizing HRTFs, adjusting, and correcting filter parameters for individual device equalization or hardware output curves. Another advantage of the parametric audio TLDR approach is that it offers scalability, trading off compute and memory footprint for desired accuracy. For example, in using a biquad filter cascade in the audio TLDR approach, more or fewer filters may be applied to more or less closely approximate the HRTF since the number of filters used changes the accuracy of audio rendering. By increasing the number of filters employed, the approach allows for modifying the rendering from device to device, or on the same device as needed. For example, when a device has more compute/battery then it can use an architecture that utilizes more filters, more closely approximating the HRTF. In low battery mode, or on a limited compute device, the parametric audio TLDR approach may switch to an architecture using fewer filters, generating the audio spatialization that is possible with the allocated filter resources. Similarly, taking room acoustics into consideration, direct sound may be spatialized at the highest resolution, while early reflections and late reverberation may be rendered at progressively lower detail or accuracy. Thus, a single parametric audio TLDR selection, configuration and application engine may be deployed across all hardware.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame, and may include, among other components, a display assembly including one or more display elements 120, a depth camera assembly (DCA), an audio system, and a position sensor 190. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 110 holds the other components of the headset 100. The frame 110 includes a front part that holds the one or more display elements 120 and end pieces (e.g., temples) to attach to a head of the user. The front part of the frame 110 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 120 provide light to a user wearing the headset 100. As illustrated the headset includes a display element 120 for each eye of a user. In some embodiments, a display element 120 generates image light that is provided to an eyebox of the headset 100. The eyebox is a location in space that an eye of user occupies while wearing the headset 100. For example, a display element 120 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 120 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 120 are at least partially transparent, such that light from the local area may be combined with light from the one or more display elements to produce AR and/or MR content.

In some embodiments, a display element 120 does not generate image light, and instead is a lens that transmits light from the local area to the eyebox. For example, one or both of the display elements 120 may be a lens without correction (non-prescription) or a prescription lens (e.g., single vision, bifocal and trifocal, or progressive) to help correct for defects in a user's eyesight. In some embodiments, the display element 120 may be polarized and/or tinted to protect the user's eyes from the sun.

In some embodiments, the display element 120 may include an additional optics block (not shown). The optics block may include one or more optical elements (e.g., lens, Fresnel lens, etc.) that direct light from the display element 120 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 130 and a DCA controller (not shown in FIG. 1A), and may also include an illuminator 140. In some embodiments, the illuminator 140 illuminates a portion of the local area with light. The light may be, e.g., structured light (e.g., dot pattern, bars, etc.) in the infrared (IR), IR flash for time-of-flight, etc. In some embodiments, the one or more imaging devices 130 capture images of the portion of the local area that include the light from the illuminator 140. As illustrated, FIG. 1A shows a single illuminator 140 and two imaging devices 130. In alternate embodiments, there is no illuminator 140 and at least two imaging devices 130.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 140), some other technique to determine depth of a scene, or some combination thereof.

The audio system provides audio content. The audio system includes a transducer array, a sensor array, and an audio controller 150. However, in other embodiments, the audio system may include different and/or additional components. Similarly, in some cases, functionality described with reference to the components of the audio system can be distributed among the components in a different manner than is described here. For example, some or all of the functions of the controller may be performed by a remote server.

The transducer array presents sound to user. The transducer array includes a plurality of transducers. A transducer may be a speaker 160 or a tissue transducer 170 (e.g., a bone conduction transducer or a cartilage conduction transducer). Although the speakers 160 are shown exterior to the frame 110, the speakers 160 may be enclosed in the frame 110. In some embodiments, instead of individual speakers for each ear, the headset 100 includes a speaker array comprising multiple speakers integrated into the frame 110 to improve directionality of presented audio content. The tissue transducer 170 couples to the head of the user and directly vibrates tissue (e.g., bone or cartilage) of the user to generate sound. The number and/or locations of transducers may be different from what is shown in FIG. 1A.

The sensor array detects sounds within the local area of the headset 100. The sensor array includes a plurality of acoustic sensors 180. An acoustic sensor 180 captures sounds emitted from one or more sound sources in the local area (e.g., a room). Each acoustic sensor is configured to detect sound and convert the detected sound into an electronic format (analog or digital). The acoustic sensors 180 may be acoustic wave sensors, microphones, sound transducers, or similar sensors that are suitable for detecting sounds.

In some embodiments, one or more acoustic sensors 180 may be placed in an ear canal of each ear (e.g., acting as binaural microphones). In some embodiments, the acoustic sensors 180 may be placed on an exterior surface of the headset 100, placed on an interior surface of the headset 100, separate from the headset 100 (e.g., part of some other device), or some combination thereof. The number and/or locations of acoustic sensors 180 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 150 processes information from the sensor array that describes sounds detected by the sensor array. The audio controller 150 may comprise a processor and a computer-readable storage medium. The audio controller 150 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof. In some embodiments, the audio controller 150 selects an audio TLDR that approximates a given HRTF at a particular level of accuracy. The TLDR is selected based on any of input parameters such as: a target power consumption, a target compute load specification, and target memory footprint. In some embodiments, a target level of accuracy of HRTF approximation may be received as an input parameter. In these embodiments, the audio controller 150 may select an audio TLDR from a set of audio TLDRs based on the input target level of accuracy using a model that maps audio TLDRs to levels of accuracy in approximating a given HRTF. Subsequently, the audio controller configures the selected audio TLDR based on any of input parameters such as: a target sound source angle and a target fidelity of audio rendering. The audio controller applies the selected and configured audio TLDR to an input audio signal received at a single channel to generate multi-channel spatialized audio content for providing to the speakers 160.

The position sensor 190 generates one or more measurement signals in response to motion of the headset 100. The position sensor 190 may be located on a portion of the frame 110 of the headset 100. The position sensor 190 may include an inertial measurement unit (IMU). Examples of position sensor 190 include: one or more accelerometers, one or more gyroscopes, one or more magnetometers, another suitable type of sensor that detects motion, a type of sensor used for error correction of the IMU, or some combination thereof. The position sensor 190 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 130 of the DCA may also function as the PCA. The images captured by the PCA and the depth information determined by the DCA may be used to determine parameters of the local area, generate a model of the local area, update a model of the local area, or some combination thereof. Furthermore, the position sensor 190 tracks the position (e.g., location and pose) of the headset 100 within the room. Additional details regarding the components of the headset 100 are discussed below in connection with FIG. 8.

Figure 2:
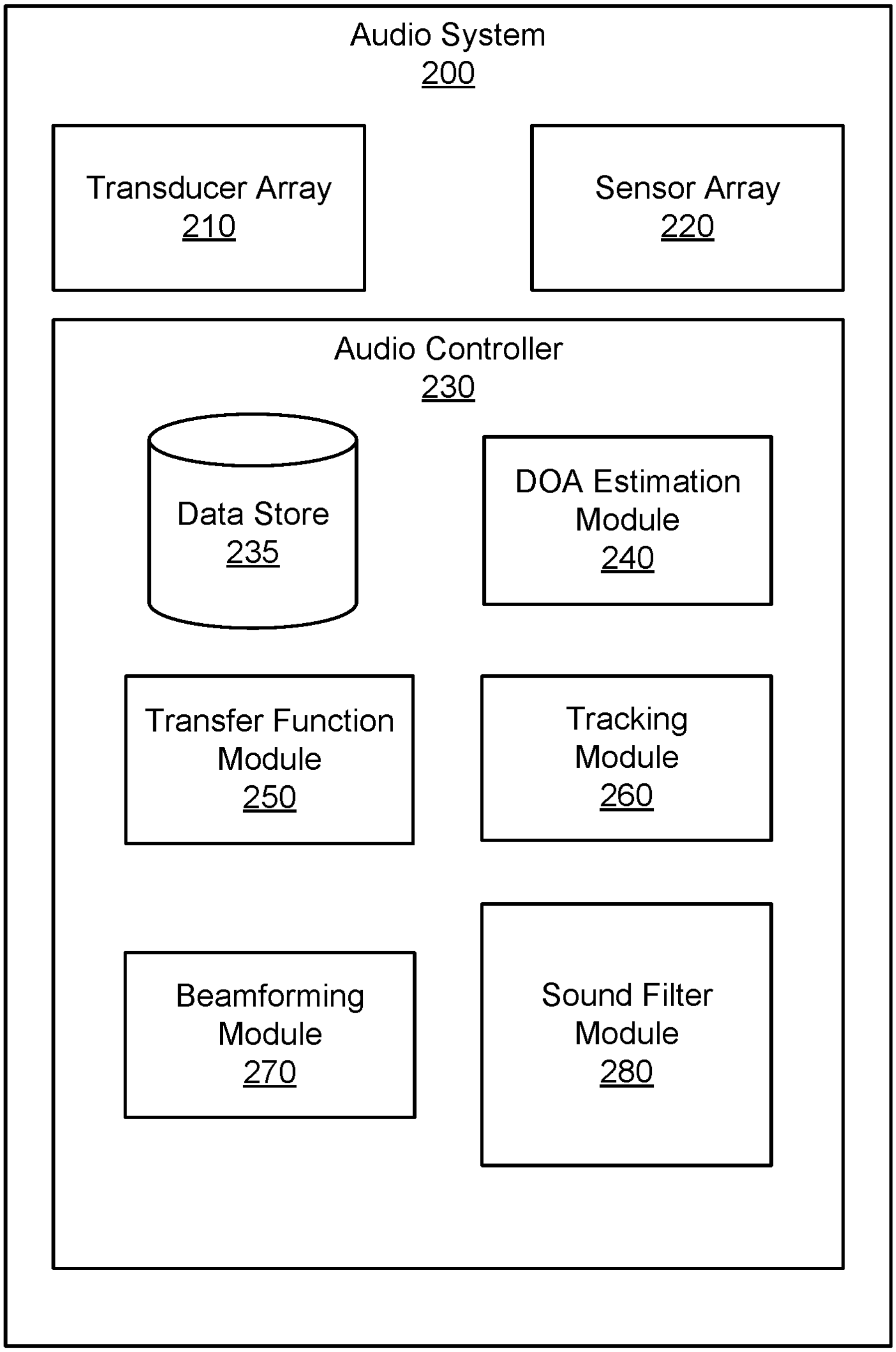
FIG. 2 is a block diagram of an audio system, in accordance with one or more embodiments.

FIG. 2 is a block diagram of an audio system 200, in accordance with one or more embodiments. The audio system in FIG. 1A or FIG. 1B may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 170), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a transfer function module 250, a tracking module 260, a beamforming module 270, and a sound filter module 280. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, and other data relevant for use by the audio system 200, or any combination thereof.

The data store 235 also stores data in association with the operation of the sound filter modules associated with the selection and application of an audio TLDR. The stored data may include static filter parameter values, one dimensional and two dimensional interpolating look-up tables for looking up frequency/gain/Q triplet parameter values for a given azimuth and/or elevation target sound source angles, such as filter parameters, look-up tables, etc. The data store 235 may also store single channel audio signals for processing at the audio TLDR and presentation to a user at the headset as spatialized audio content through multiple channels. In some embodiments, the data store 235 may store default values for input parameters such as target fidelity of the audio content rendering in the form of target frequency response values, target signal to noise ratios, target power consumption by a selected audio TLDR, target compute requirements of a selected audio TLDR, and target memory footprint of a selected audio TLDR. The data store 235 may store values such as a desired spectral profile and equalization for the generated spatialized audio content from the audio TLDR. In some embodiments, the data store 235 may store a selection model for use in selecting an audio TLDR based on input parameter values. The stored selection model may be in the form of a look-up table that maps ranges of input parameter values to one of the audio TLDRs. In some embodiments, the stored selection model may be in the form of specific weighted combinations of the input parameter values that are mapped to one of the audio TLDRs. In some embodiments, the data store 235 may store data for use by a parametric filter fitting system (such as system 600 described with respect to FIG. 6). The stored data may include a set of measured HRTFs associated with context vectors, spatial location of a sound source, such as azimuth and elevation values, as well as anthropometric features of one or more users. The data store 235 may also store updated audio filter parameter values as determined by the parametric filter fitting system.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF)

domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 190), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The transfer function module 250 is configured to generate one or more acoustic transfer functions. Generally, a transfer function is a mathematical function giving a corresponding output value for each possible input value. Based on parameters of the detected sounds, the transfer function module 250 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 250 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 250 may determine HRTFs for the user using a calibration process. In some embodiments, the transfer function module 250 may provide information about the user to a remote system. The user may adjust privacy settings to allow or prevent the transfer function module 250 from providing the information about the user to any remote systems. The remote system determines a set of HRTFs that are customized to the user using, e.g., machine learning, and provides the customized set of HRTFs to the audio system 200.

The tracking module 260 is configured to track locations of one or more sound sources. The tracking module 260 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 260 may determine that the sound source moved. In some embodiments, the tracking module 260 may detect a change in location based on visual information received from the headset or some other external source. The tracking module 260 may track the movement of one or more sound sources over time. The tracking module 260 may store values for a number of sound sources and a location of each sound source at each point in time. In response to a change in a value of the number or locations of the sound sources, the tracking module 260 may determine that a sound source moved. The tracking module 260 may calculate an estimate of the localization variance. The localization variance may be used as a confidence level for each determination of a change in movement.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 260. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 may use HRTFs and/or acoustic parameters to generate the sound filters. The acoustic parameters describe acoustic properties of the local area. The acoustic parameters may include, e.g., a reverberation time, a reverberation level, a room impulse response, etc. In some embodiments, the sound filter module 280 calculates one or more of the acoustic parameters. In some embodiments, the sound filter module 280 requests the acoustic parameters from a mapping server (e.g., as described below with regard to FIG. 8).

In some embodiments, the sound filter module 280 may select and configure an audio TLDR from a set of possible audio TLDRs based on received input parameters. The received input parameters may include a target sound source angle, a target fidelity of audio rendering, target power consumption, target compute load, target memory footprint, a target level of accuracy in approximating a given HRTF, etc. The selected and configured audio TLDR is used for generating spatialized audio content in multiple channels from an input single channel audio signal. The input single channel audio signal (also referred to as mono-audio signal, monaural audio signal, monophonic audio signal, etc.) is audio content that arrives at a single channel and may be heard as sound emanating from a single position when provided to a speaker. In the embodiments herein, the input single channel audio is processed using the selected and configured audio TLDR to generate multiple channel audio signals, (such as stereophonic audio content through two separate audio channels, e.g., a left channel and a right channel, etc.). The selected audio TLDR may be configured to use static audio filters, dynamic audio filters, and delays so that it approximates a given HRTF at a particular level of accuracy. Filtering the input single channel audio signal with the configured audio TLDR simulates applying one or more head-related transfer functions (HRTFs) of a user of the audio system to the single channel audio signal and thereby generates multi-channel spatialized audio content. Details regarding the selection, configuration and application of an audio TLDR based on one or more input parameters using a filter parameter model may be found in the discussion with respect to FIG. 3. In some embodiments, the sound filter module 280 may request data in association with the filter parameter model from a parametric filter fitting system for HRTF rendering (e.g., as described below with respect to FIG. 8).

The sound filter module 280 provides the sound filters to the transducer array 210. In some embodiments, the sound filters may cause positive or negative amplification of sounds as a function of frequency. In embodiments described, audio content presented by the transducer array is multi-channel spatialized audio. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200.

Figure 3:
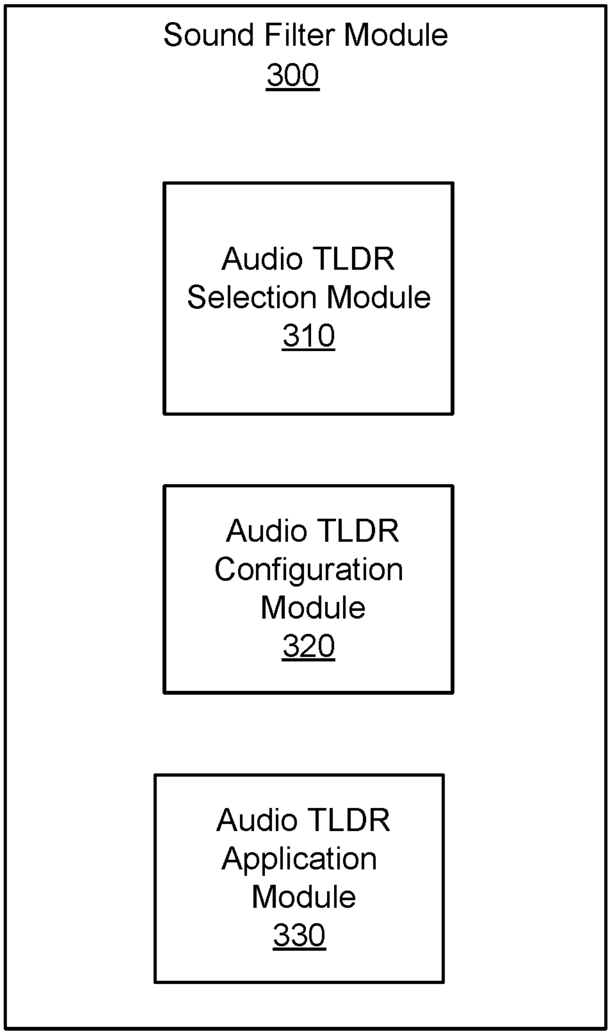
FIG. 3 is a block diagram of the components of a sound filter module, in accordance with one or more embodiments.

FIG. 3 is a block diagram of the components of a sound filter module, in accordance with one or more embodiments. The sound filter module 300 is an embodiment of the sound filter module 280 depicted in FIG. 2. The sound filter module 300 includes an audio TLDR selection module 310, an audio TLDR configuration module 320, and an audio TLDR application module 330. In alternative configurations, the module 300 may include different and/or additional modules. Similarly, functions can be distributed among the modules in different manners than described here.

The audio TLDR selection module 310 selects an audio TLDR from a set of possible audio TLDRs for generating multiple channel spatialized audio content from a single channel input audio signal. The set of possible audio TLDRs may include a range of audio TLDRs, from audio TLDRs with few configured filters to audio TLDRs with several configured filters. Audio TLDRs with few filters may have lower power consumption, lower compute load, and/or lower memory footprint requirements when compared to audio TLDRs with increasing numbers of cascaded static and dynamic filters that have correspondingly increasing power consumption, compute load, and/or memory footprint requirements. As the number of static and dynamic audio filters increase in an audio TLDR, there is a corresponding improvement in its accuracy in approximating a magnitude spectrum of a given HRTF. For example, an audio TLDR with several configured dynamic binaural filters may be capable of being close to approximating a full given HRTF (i.e., to within a decibel or so across the full audible range). Thus, there is a trade-off in the selection module 310 selecting an audio TLDR with additional filters since such an audio TLDR will lead to a corresponding increase in power consumption, compute load, and memory requirements, while providing an improved approximation of a given HRTF when used in generating spatialized audio content.

In some embodiments, the set of possible audio TLDRs includes three audio TLDRs that provide different levels of accuracy in approximating the magnitude spectrum of a given HRTF. In these embodiments, the set includes: (i) an audio TLDR that provides a first approximation of a given HRTF using two biquad filters and a delay, along with one-dimensional interpolating look-up tables for configuring the filters, (ii) a second audio TLDR that provides a second approximation of the given HRTF using six biquad filters, two gain adjust filters, and one-dimensional and two-dimensional interpolating look-up tables for configuring the filters, and (iii) a third audio TLDR that provides a third approximation of the given HRTF using twelve biquad filters, and one-dimensional and two-dimensional interpolating look-up tables for configuring the filters. In these embodiments, as the number of filters in the selected audio TLDR increases, the corresponding approximation of a given HRTF is closer to the full magnitude of the given HRTF, i.e., the third approximation of the given HRTF is more accurate than the second approximation, which is more accurate than the first approximation of the given HRTF. Furthermore, each of the audio TLDRs in the set of audio TLDRs may be associated with a particular range of memory footprint, compute load, power consumption etc. In alternative embodiments, the audio TLDRs in the set may have different numbers of static and dynamic filters, including more or less than a pair of binaural biquad filters, etc. In some embodiments, the filters in an audio TLDR may be coupled in a different manner than described here.

The selection of the particular audio TLDR from the set of possible audio TLDRs by the audio TLDR selection module 310 is based on certain input parameters. In some embodiments, the input parameters may include a target power consumption, target compute requirements, target memory footprint, and a target level of accuracy in approximating a given HRTF, etc. The input parameters also specify a target fidelity of the audio content rendering as a target frequency response, a target signal to noise ratio, etc., for the rendered audio content. In some embodiments, a weighted combination of the received input parameters may be used in selecting the audio TLDR. In some embodiments, the module 310 may obtain default values for these parameters from the data store 235 and use the default values in selecting the audio TLDR. Given input parameters (e.g., a target memory footprint and a target compute load), the audio TLDR selection module 310 may select a particular audio TLDR from the set of possible audio TLDRs using a selection model retrieved from the data store 235. The selection model may be in the form of a look-up table that maps ranges of input parameter values to one of the audio TLDRs in the set of possible audio TLDRs. In some embodiments, the selection model may map specific weighted combinations of the input parameter values to one of the audio TLDRs. Other selection models may also be possible. In some embodiments, the audio TLDR selection module 310 may receive input parameters in the form of a specification of a target level of accuracy in approximating a given HRTF. In these embodiments, the TLDR selection module 310 may select an audio TLDR from the set of audio TLDRs based on a model. The model may be in the form of, for example, a look-up table, that maps specific audio TLDRs in the set to achieving particular levels of accuracy in approximating a given HRTF. In such embodiments, the target level of accuracy of approximation of the given HRTF may be specified as an input parameter using a virtual and/or physical input mechanism (e.g., dial) that may be tuned to specify the target approximation accuracy level.

The audio TLDR configuration module 320 configures the various filters of a selected audio TLDR to provide an approximation of a given HRTF. In some embodiments, the audio TLDR configuration module 320 may retrieve one or more models from the data store 235 for use in configuring the various filters of the selected audio TLDR. The module 320 receives and user input parameters such as a target sound source angle along with the retrieved models to configure the filters of the selected audio TLDR. As noted previously, the input target sound source angle may be specified as an azimuth value and/or an elevation value. For example, the input target sound source angle may specify azimuth and elevation values for the location of a virtual singer performing on a virtual stage. The module configures the filters so that the configured audio TLDR may subsequently receive and process a single channel audio signal to generate spatialized audio content corresponding to multiple channel audio signals (e.g., left and right channel audio signals) for presentation to a user.

In embodiments described herein, the module 320 configures the selected audio TLDR as a cascaded series of infinite impulse response (IIR) filters and fractional or non-fractional delays to generate the spatialized audio content corresponding to multiple channel audio signals (e.g., left and right channel audio signals) from the input single channel audio signal. In some embodiments, the cascaded series of IIR filters may be biquad filters, which are 2nd-order recursive linear filters comprised of two poles and two zeros. Biquad filters used in embodiments herein include "high-shelf" and "peak/notch" filters. Parameters of these biquad filters may be specified using filter type (high-shelf vs peak/notch) and frequency/gain/Q triplet parameter values. The cascaded series of IIR filters may be one or more single channel (i.e., monaural) static filters, monaural dynamic filters, as well as multiple channel (i.e., binaural) dynamic filters.

The audio TLDR configuration module 320 may configure fixed (i.e., unchanging with respect to target sound source angle) parameters of each static monaural filter in the selected audio TLDR as scalar values. A static filter is configured by the module 320 to mimic those components of an HRTF that are substantially constant and independent of location relative to the user (e.g., the center frequency, gain and Q values configured for the static filter). For example, the static filters may be viewed as approximating a shape of one or more HRTFs, as well as allowing for an adjustment of the overall coloration (e.g., spectral profile, equalization, etc.) of the generated spatialized audio content. For example, a static filter may be adjusted to match the coloration of a true HRTF so that the final binaural output may feel more natural from an aesthetic standpoint to the user. Thus, the configuration of a static filter may involve adjusting parameter values of the filter (e.g., any of the center frequency, gain, and Q values) in a manner that is independent of the location of the sound source but that is aesthetically suitable for the user. The module 320 configures a static filter for application to audio signals received at a single channel. In embodiments where the selected audio TLDR has a plurality of static filters, the plurality of static filters may process an incoming single channel audio signal in series, in parallel, or some combination thereof. A static filter may be, e.g., a static high shelf filter, a static notch filter, some other type of filter, or some combination thereof.

Dynamic filters in the selected audio TLDR process an input audio signal to generate spatialized audio content, i.e., audio content that appears to be originating from a particular spatial location relative to the user. The dynamic filters in the selected audio TLDR may be monaural dynamic filters as well as binaural dynamic filters. In contrast to a static filter, the filter parameters for a dynamic filter, both monaural and binaural, are based in part on the target location relative to the location of the user (e.g., azimuth, elevation). The monaural dynamic filters may be coupled to the monaural static filters described above (i.e., receive input audio signal and generate an output audio signal) through the single channel. The binaural dynamic filters are coupled (i.e., receive an input audio signal and generate an output audio signal) through each individual channel of multiple audio channels (such as a connected left channel and a connected right channel). The binaural dynamic filters are used to reproduce frequency-dependent interaural level differences (ILD) across the ears, including contralateral head shadow as well as pinna-shadow effects observed in the rear hemi-field. Binaural filters may be, e.g., a peak filter, a high-shelf filter, etc., that are applied in series to each audio channel signal of the multiple audio channels. While a same general type of dynamic filter (e.g., peak filter) may be configured for multiple audio channel signals—the specific shape of each filter may be different. Typical HRTFs of users tend to have a first peak at around 4-6 kHz and a main notch at around 5-7 kHz. In some embodiments, the monaural dynamic audio filters are configured to produce such a main first peak (e.g., at around 4-6 kHz) and such a main notch (e.g., at around 5-7 kHz) that are found in typical HRTFs. In alternate embodiments, the binaural dynamic filters are configured to produce such a main first peak and main notch.

The audio TLDR configuration module 320 retrieves one or more models from the data store 235 for configuring the selected audio TLDR. The models may be look-up tables, functions, models that have been trained using machine learning techniques, etc., or some combination thereof. A retrieved model maps various values of target sound source angles to corresponding filter parameter values such as center frequency/gain/Q triplet values. In some embodiments, the model is represented as one or more look-up tables that use input azimuth and/or elevation parameter values to output linearly interpolated values for the triplet values. In some embodiments, the look-up tables may have content values with the azimuth and elevation parameter values defined in degrees, and as noted previously, a coordinate system defined as follows: an azimuth parameter value of 0° is defined as straight ahead relative to the user's head, negative values are to the left of the user's head, and positive values are to the right of the user's head; an elevation parameter value of 0° is defined as level with the user's head, negative values are below the user's head, and positive values are above the user's head. In some embodiments, the model may map any of either the received azimuth or elevation parameter input values to the dynamic filter parameters through interpolating one-dimensional look-up tables. In some embodiments, the model may map both the received azimuth and elevation parameters to dynamic filter parameters through interpolating one-dimensional look-up tables. In some embodiments, the model may map both the received azimuth and elevation parameter input values to the dynamic filter parameters through interpolating two-dimensional look-up tables. However, the latter embodiments may have high memory and cpu requirements.

The module 320 may configure the dynamic filters of the selected audio TLDR as frequency/gain/Q triplet values using the retrieved model based on the input target source angle. The module 320 may use retrieved one-dimensional interpolating look-up tables to input either one of azimuth or elevation values from the input target sound source angle in order to obtain filter parameters such as the center frequency/gain/Q triplet values. Alternatively, the module 320 may use retrieved one-dimensional interpolating look-up tables to input both azimuth and elevation values from the input target sound source angle in order to obtain filter parameters such as the center frequency/gain/Q triplet values. Using the two-dimensional look-up tables allows for a much closer approximation of a given HRTF. However, the memory requirements of the configured TLDR also increases.

The audio TLDR configuration module 320 may configure a fractional delay between a left and a right audio channel. The module 320 determines an amount of delay to be applied based on the input target location using a model (such as a look-up table) retrieved from the data store 235. The configured delay may be a fractional delay or a non-fractional delay, and it mimics the delay between sound hitting different ears based on a position of a sound source relative to the user, thereby reproducing the interaural time differences (ITD). For example, if the sound source is to the right of a user, sound from the sound source would be rendered at the right ear before being rendered at the left ear. The audio TLDR configuration module 320 may determine the delays by, e.g., inputting the target location (e.g., azimuth and/or elevation) into the model (e.g., a look-up table). Since single sample differences (at a sampling frequency of 48 kHz) across the two ears of the user are detectable by human listeners when close to 0 degrees, ideally the fractional delays need to be implemented as a subsample delay. However, for lower compute load requirements, the module 320 may round the applied delays to a nearest whole sample.

The audio TLDR application module 330 applies configured audio TLDR to an audio signal received at a single channel to generate spatialized audio content for multiple audio channels (e.g., the left and right audio channels). The module 330 ensures that the (mono) audio signal is received at the single channel and is processed by any monaural static filters and monaural dynamic filters in the audio TLDR. The (possibly processed) audio signal is subsequently split into individual signals (such as a left signal and a right signal) for subsequent processing by any binaural filters in the configured audio TLDR. Finally, the audio TLDR application module 330 ensures that the generated spatialized audio content at the individual channels of the multiple channels is provided to the transducer array for presentation to the user at the headset. Thus, the set of configured monaural static filters and the set of configured monaural dynamic filters are connected via a single channel for receiving and outputting a single channel audio signal. Furthermore, the set of configured binaural dynamic filters are connected via corresponding left and right channels for receiving and outputting the corresponding left and right audio signals. In some embodiments, the module 330 may also generate spatialized audio content for additional audio channels. The module 330 provides the generated spatialized audio content to the transducer array 210 for presenting the spatialized audio content to the user via the headset 100. The module 320 ensures that a single channel audio signal is received and processed by an audio TLDR to generate left and right channel spatialized audio content in a method of scalable quality.

Figure 4A:
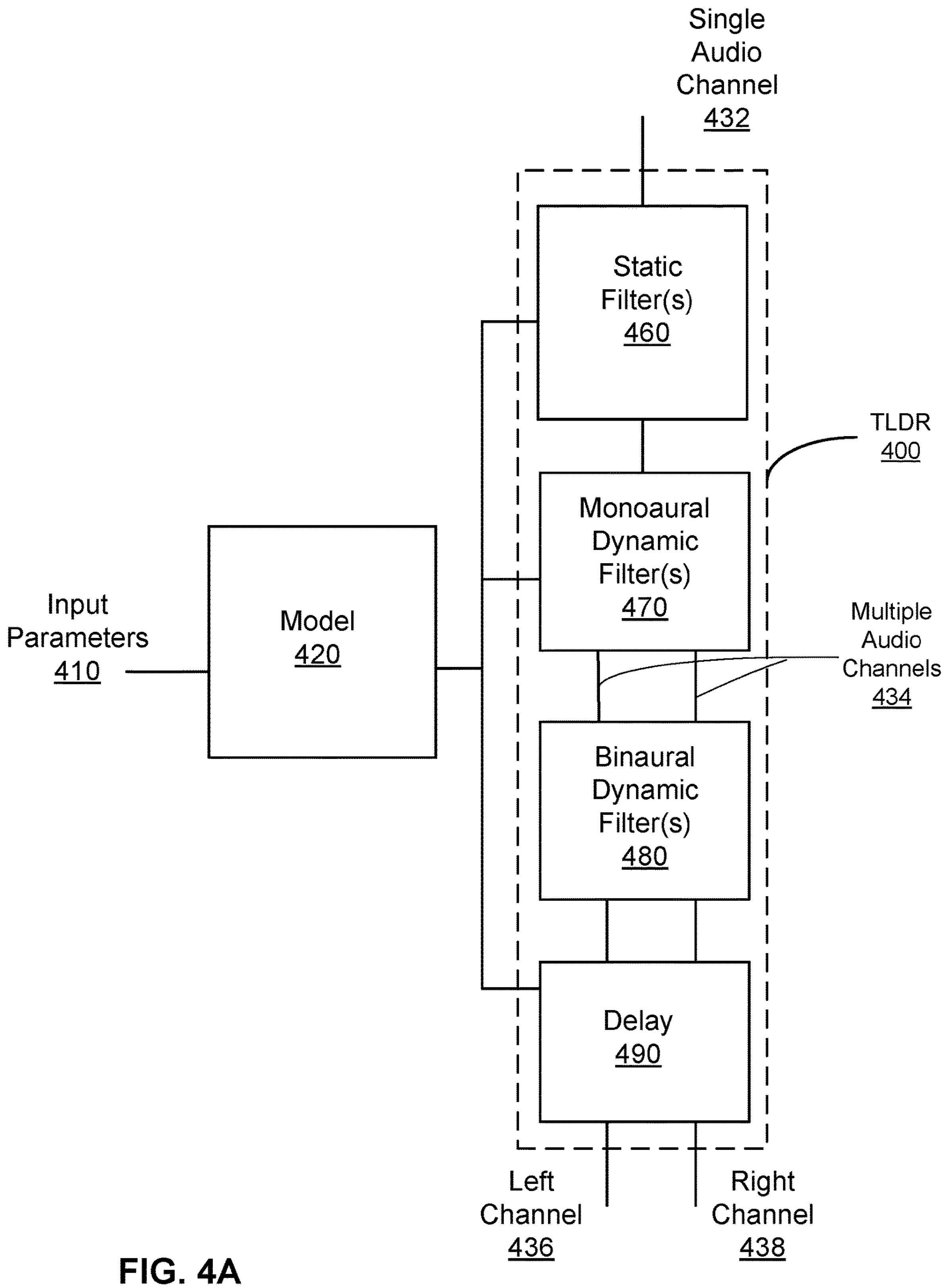
FIG. 4A is a functional depiction of an audio TLDR used to process a single channel input audio signal and generate spatialized audio content for multiple channels, in accordance with one or more embodiments.

FIG. 4A is a functional depiction of an audio TLDR 400 used to process a single channel input audio signal and generate spatialized audio content for multiple channels. The audio TLDR 400 represents an audio TLDR that has been selected and configured by the sound filter module 300. In some embodiments, there may be additional or different elements or elements in a different order than depicted herein.

In some embodiments, the input parameters 410 include the target sound source angle, including the target azimuth and target elevation values. For example, a virtual sound source may be provided 20 feet in front of the user at an elevation of 15 degrees (such as a virtual singer on a virtual stage in front of the user).

Model 420 represents the various models, such as look-up tables, functions, etc., used to obtain filter parameter values for static filters, dynamic filters, and delay in the audio TLDR 400. In some embodiments, the model 420 may be obtained from the data store 235. The model 420 may be any of the models described with respect to FIG. 3. Thus, in some embodiments, the model 420 may include one-dimensional and two-dimensional interpolating look-up tables that are used to obtain filter parameter values based on the input sound source angle values such as azimuth and/or elevation parameter values, as well as the delay values.

An audio signal is provided as input to an audio TLDR 400 at a single audio channel 430 of the selected audio TLDR 400. The input audio signal is processed by the audio TLDR 400 is used to generate spatialized multi-channel audio signals for presentation to a user via a headset.

The input audio signal at the single audio channel 432 is provided as input to one or more static filters 460. The static filters 460 may be any of the static filters described with respect to FIG. 3, such as monaural static filters. The monaural static filters 460 receive an input audio signal via the single audio channel 432 and provide processed output audio signals via the single audio channel 432. In some embodiments with more than one monaural static filter 460, the filters may be connected in series via the single audio channel 432.

An input audio signal, possibly processed by the static filters 460, is subsequently provided via the single audio channel 432 as input to one or more dynamic monaural filters 470. The monaural dynamic filters may be any of the monaural dynamic filters described with respect to FIG. 3. The monaural dynamic filters 470 receive an input audio signal via the single audio channel 432 and provide processed output audio signals via the single audio channel 432. In some embodiments with more than one monaural dynamic filter 470, the filters may be connected in series via the single audio channel 432.

An input audio signal, possibly processed by the monaural static filters 460 and the monaural dynamic filters 470, is subsequently provided as input to one or more dynamic binaural filters 480. The binaural dynamic filters may be any of the binaural dynamic filters described with respect to FIG. 3. The binaural dynamic filters 480 receive an input audio signal at each of multiple audio channels 434 (e.g., a left audio channel and a right audio channel). In some embodiments, the output audio signal received from the monaural filters (e.g., one or more of the static filters 460 and/or the dynamic monaural filters 470) via the single audio channel 432 is split and provided as input to the dynamic binaural filters 480 via the multiple audio channels 434. Multiple audio signals are generated as output by the dynamic binaural filters 480 at the multiple audio channels. Input audio signals at multiple channels are processed to enforce a delay 490 between the channels, as described with respect to FIG. 3.

Subsequent to processing the input audio signal received at the single channel 432, the audio TLDR 400 generates spatialized audio content via multiple audio channels, such as the depicted left channel 436 and right channel 438. While FIG. 4 depicts the flow of an input mono audio signal via the single audio channel 432 and multiple audio channels 434 in a particular order, other embodiments may use different orders for processing the mono audio channel by the audio TLDR 400 to generate the multi-channel spatialized audio content.

Figure 4B:
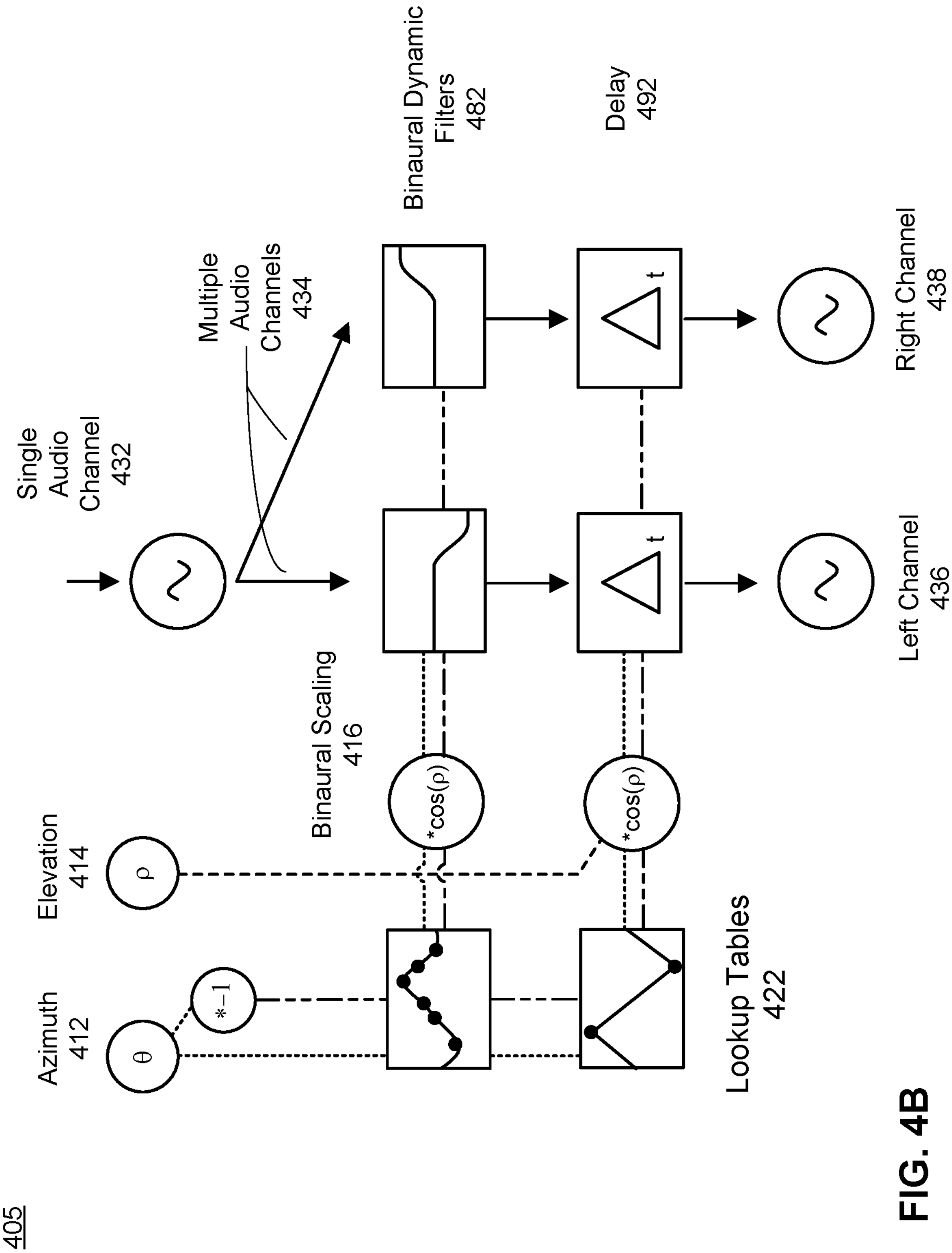
FIG. 4B is a depiction of an audio TLDR that generates spatialized audio content based on a first approximation of a user HRTF, in accordance with one or more embodiments.

FIG. 4B depicts an audio TLDR 405 that generates spatialized audio content based on a first approximation of a user HRTF, in accordance with one or more embodiments. The audio TLDR 405 is an audio TLDR that has been configured based on input azimuth (θ) 412 and elevation (ρ) 414 values that specify a target sound source angle. The configuration of the audio TLDR 405 with respect to the target sound source angle is based on look-up tables 422. The look-up tables 422 are an embodiment of the model for configuration as described with respect to FIG. 3. A mono audio signal received at the single audio channel 432 is processed by the audio TLDR 405 to generate multi-channel spatialized audio signals at the left channel 436 and the right channel 438.

The audio TLDR 405 has dynamic binaural filters 482 with an associated delay 492 between them. The input audio signal received at the single audio channel 432 is split and provided as input to the dynamic binaural filters 482 via the multiple audio channels 434. The binaural dynamic filters 482 receive an input audio signal at each of multiple audio channels 434 (e.g., a left audio channel and a right audio channel). The dynamic filters 482 are embodiments of the dynamic binaural filters described with respect to FIG. 3. The dynamic filters 482 have been configured using one-dimensional look-up tables using either an input azimuth value or an input elevation value. In audio TLDR 405, the dynamic filters 482 are a pair of independently controlled high shelf biquad filters. Since the binaural properties of some of the filters may change with elevation values, in some embodiments, the gain values that are passed to the dynamic filters 482 may be scaled by the cosine of the received elevation parameter value (that may be represented either in degrees from −90° to +90° or in radians from $-\pi/2$ to $+\pi/2$) as depicted by binaural scaling 416. In this light-weight configuration, given a sufficiently high sample rate for the audio signal, the delay 492 may be implemented as rounded to a nearest whole sample, making this a very efficient means to manipulate the perception of direction of the sound source. However, the azimuth perception of the sound source using the audio TLDR 405 may be rudimentary.

Figure 4C:
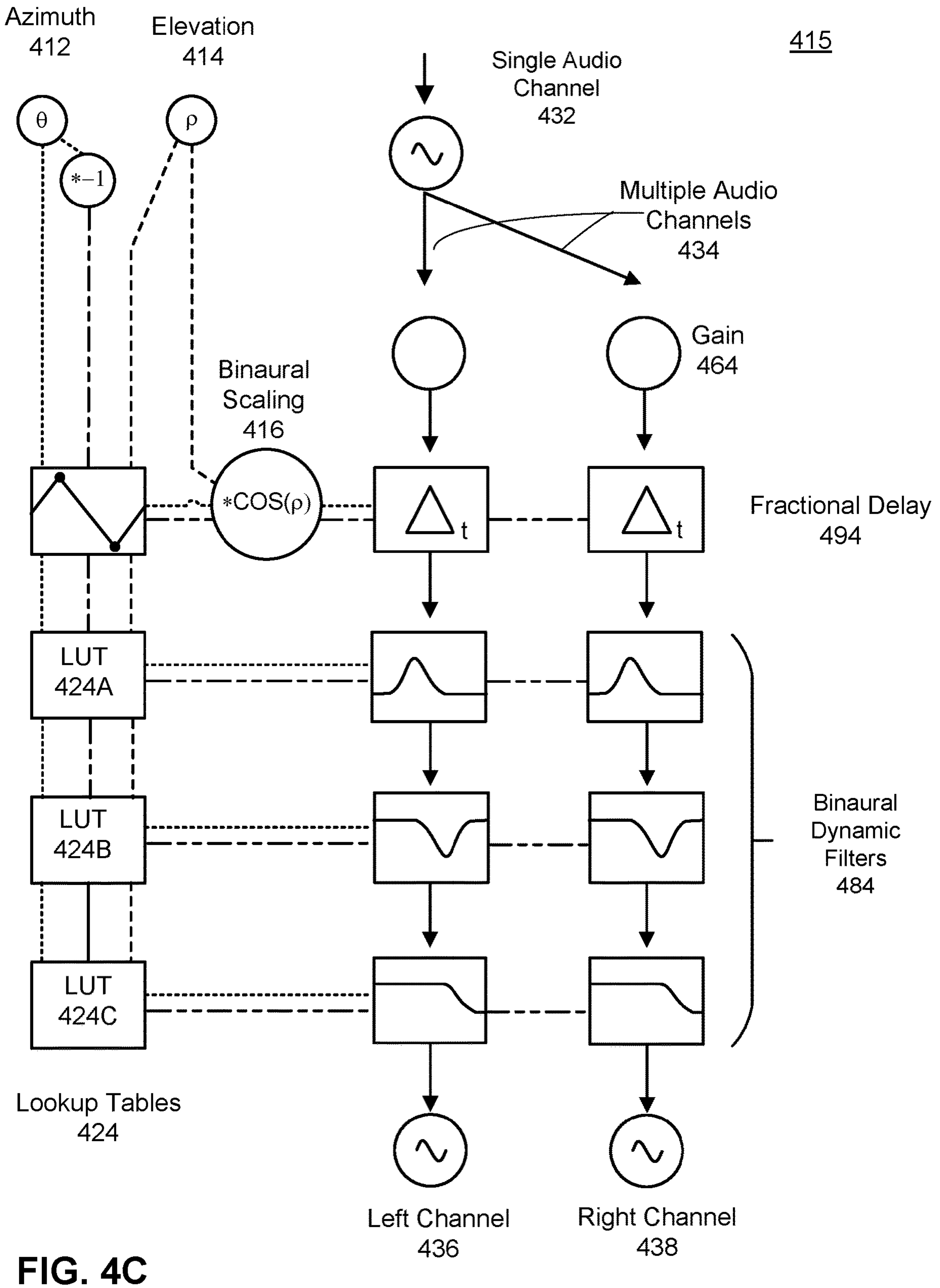
FIG. 4C is a depiction of an audio TLDR that generates spatialized audio content based on a second approximation of a user HRTF, in accordance with one or more embodiments.

FIG. 4C depicts an audio TLDR 415 that generates spatialized audio content based on a third approximation of a user HRTF, in accordance with one or more embodiments. The second approximation is more accurate that the first approximation used by the audio TLDR 405 of FIG. 4B. The audio TLDR 415 has been configured based on input azimuth (θ) 412 and elevation (ρ) 414 values that specify a target sound source angle. The configuration of the audio TLDR 415 with respect to the target sound source angle is based on look-up tables 424. The look-up tables 424 are an embodiment of the model for configuration as described with respect to FIG. 3. A mono audio signal received at the single audio channel 432 is processed by the audio TLDR 415 to generate multi-channel spatialized audio signals at the left channel 436 and the right channel 438.

The audio TLDR 415 depicts static gain filters 464 as well as dynamic binaural filters 484, and an associated fractional delay 494. The input audio signal is received at the single audio channel 432. The signal may be processed by any static monaural filters (not shown) before being split and provided as input to gain filters 464 as well as the dynamic binaural filters 484 via the multiple audio channels 434. The binaural dynamic filters 484 receive an input audio signal at each of multiple audio channels 434 (e.g., a left audio channel and a right audio channel). The primary change in TLDR 415 from TLDR 405 is that the dynamic filters here have been configured using two-dimensional interpolating look-up tables 424A, 424B, and 424C. These tables are associated with both the azimuth and the elevation value specified in the input target sound source angle, instead of just the one-dimensional azimuth or elevation look-up tables used in configuring TLDR 405. Using the two-dimensional look-up tables allows for a much closer approximation of the given HRTF. However, the use of the two-dimensional look-up increases the memory requirements of TLDR 415.

Figure 4D:
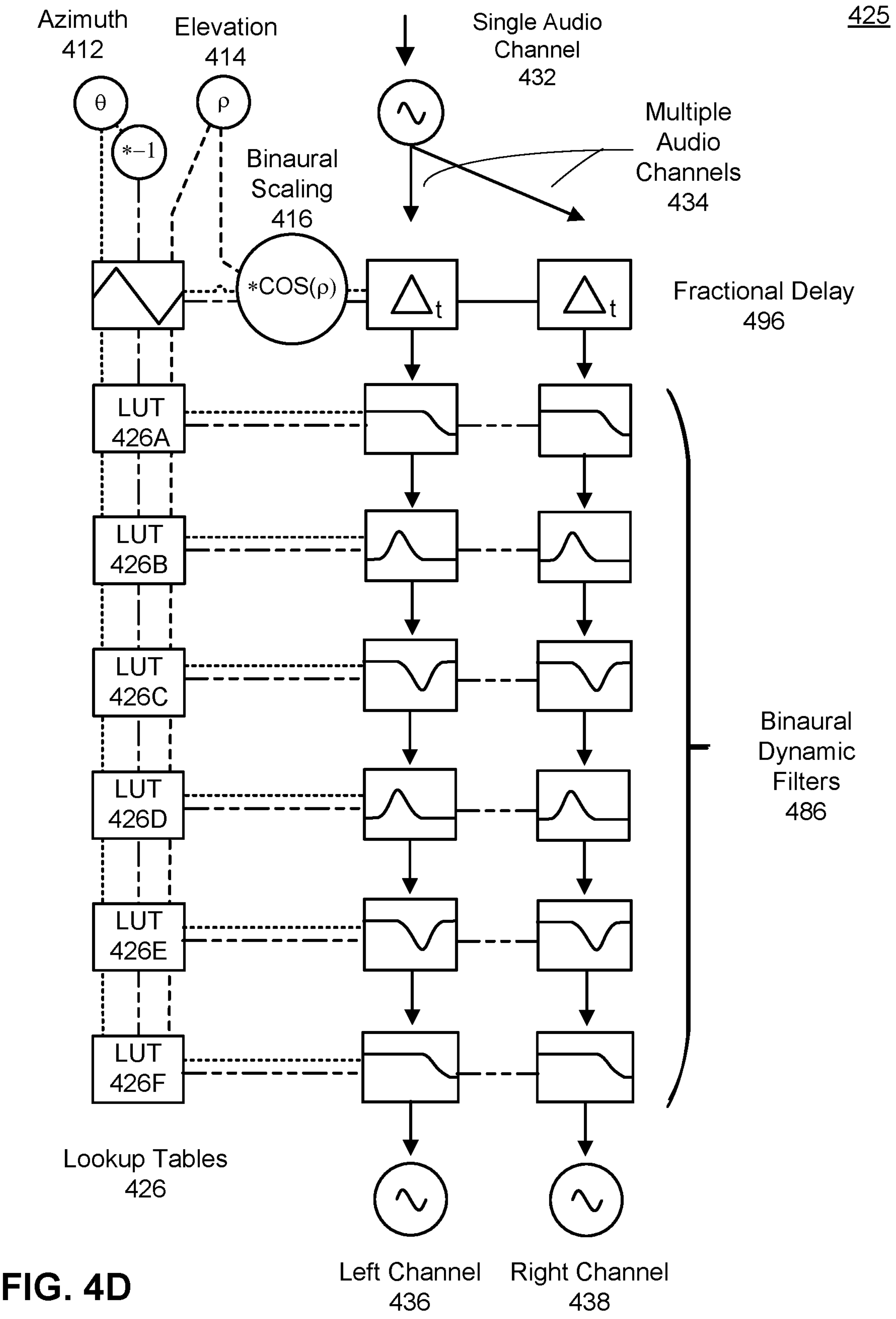
FIG. 4D is a depiction of an audio TLDR that generates spatialized audio content based on a third approximation of a user HRTF, in accordance with one or more embodiments.

FIG. 4D depicts an audio TLDR 425 that generates spatialized audio content based on a third approximation of a user HRTF, in accordance with one or more embodiments. The third approximation is more accurate that the second approximation used by the audio TLDR 415 of FIG. 4C. The audio TLDR 425 has been configured based on input azimuth (θ) 412 and elevation (ρ) 414 values that specify a target sound source angle. The configuration of the audio TLDR 425 with respect to the target sound source angle is based on look-up tables 426. The look-up tables 426 are an embodiment of the model for configuration as described with respect to FIG. 3. A mono audio signal received at the single audio channel 432 is processed by the audio TLDR 425 to generate multi-channel spatialized audio signals at the left channel 436 and the right channel 438.

The configured audio TLDR 425 depicts dynamic binaural filters 486, and an associated fractional delay 496. The input audio signal is received at the single audio channel 432. The signal may be processed by any static monaural filters (not shown) before being split and provided as input to the dynamic binaural filters 486 via the multiple audio channels 434. The binaural dynamic filters 486 receive an input audio signal at each of multiple audio channels 434 (e.g., a left audio channel and a right audio channel). As with the audio TLDR 415 depicted in FIG. 4C, the primary change in TLDR 425 from TLDR 405 is that the dynamic filters here have been configured using two-dimensional interpolating look-up tables 426A, 426B, 426C, 426D, 426E, and 426F. These tables are associated with both the azimuth and the elevation value specified in the input target sound source angle, instead of just the one-dimensional azimuth or elevation look-up tables used in configuring TLDR 405. Using the two-dimensional look-up tables allows for a much closer approximation of the given HRTF. However, the use of the two-dimensional look-up increases the memory requirements of TLDR 425. The goal of TLDR 425 is to approximate the spectral shape of an arbitrary given HRTF to within a <1 decibel accuracy across a range of frequencies from 100 Hz to 16,000 Hz.

Figure 5:
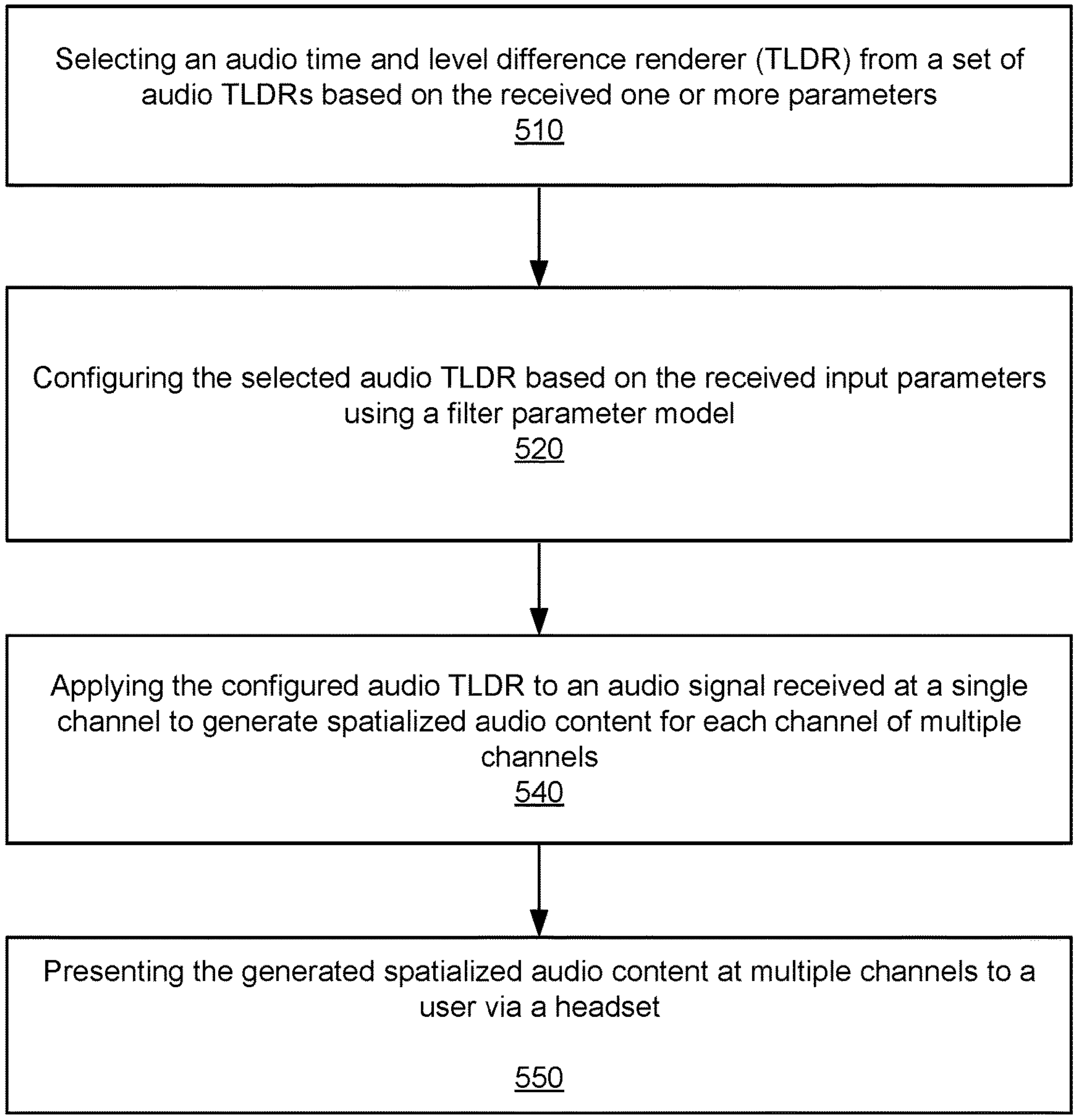
FIG. 5 is a flowchart illustrating a process for generating spatialized left and right channel audio signals from an input mono channel audio signal using a parametric audio TLDR selection and application module, in accordance with one or more embodiments.

FIG. 5 is a flowchart illustrating a process 500 for generating spatialized audio signals for left and right channel audio signals from a single channel audio signal, in accordance with one or more embodiments. The process shown in FIG. 5 may be performed by components of an audio system (e.g., audio system 200). Other entities may perform some or all of the steps in FIG. 5 in other embodiments. Embodiments may include different and/or additional steps or perform the steps in different orders.

The audio system selects 510 an audio TLDR from a set of audio TLDRs based on one or more received input parameters. The received input parameters may include a target sound source angle and a target fidelity of audio content rendering. In some embodiments, the target sound source angle may include an azimuth parameter value and an elevation parameter value. In some embodiments, the target fidelity of audio content rendering may include any of: a target frequency response for the generated spatialized audio content and a target signal to noise ratio for the generated spatialized audio content. In some embodiments, the received input parameters may also include any of: a target power consumption specification, target compute load specification, and/or a target memory footprint. In some embodiments, the received input parameters may include a specification of a target approximation of a given HRTF. In such embodiments, a user may be able to specify the target approximation of the given HRTF as a virtual or physical dial that may be tuned by the user to specify the target approximation.

The audio system selects 510 an audio TLDR from a set of audio TLDRs based on the one or more received input parameters. In some embodiments, the audio system may select 520 an audio TLDR based on a weighted combination of the received input parameters. In some embodiments, the audio system may select 520 any of a possible set of audio TLDRs, from an audio TLDR that uses a few filters to an audio TLDR that uses several cascaded static and dynamic audio filters. In some embodiments, the audio system may select 520 one or more of the following four audio TLDRs that provide an increasing level of accuracy in approximating a given HRTF: (i) an audio TLDR that provides a first approximation of a given HRTF using two biquad filters and one fractional or non-fractional delay, along with one-dimensional interpolating look-up tables for parameters, (ii) a second audio TLDR that provides a second approximation of the given HRTF using eight biquad filters and one-dimensional interpolating look-up tables for parameters, (iii) a third audio TLDR that provides a third approximation of the given HRTF using six biquad filters, two gain adjust filters, and one-dimensional and two-dimensional interpolating look-up tables for parameters, and (iv) a fourth audio TLDR that provides a fourth approximation of the given HRTF using twelve biquad filters, and one-dimensional and two-dimensional interpolating look-up tables for parameters. In these embodiments, as the number of filters in the selected audio TLDR increases, the corresponding approximation of a given HRTF is closer to the full magnitude of the given HRTF. In some embodiments, the audio system may select 520 an audio TLDR for configuration based on a received specification of the target HRTF approximation. In some embodiments, the audio TLDRs in the set may have different numbers of static and dynamic filters, including more or less than a pair of binaural biquad filters, etc. In some embodiments, the filters in an audio TLDR may be coupled in a different manner than described here.

The audio system configures 530 the selected audio TLDR based on the received input parameters using a filter parameter model. In some embodiments, the audio system may configure 530 the selected audio TLDR as a cascaded series of infinite impulse response (IIR) filters and fractional or non-fractional delays. In some embodiments, the audio system may configure the cascaded series of IIR filters as any of: one or more monaural static filters, one or more monaural dynamic filters, as well as one or more binaural dynamic filters. In some embodiments, the audio system may configure 530 the selected audio TLDR to have a delay between multiple channels. In some embodiments, the audio system may configure 530 the filter parameters and delay in the selected audio TLDR using a filter parameter model. The filter parameter model may be retrieved from a data store in association with the audio system and may be any of: one or more one-dimensional interpolating look-up tables specifying filter parameter values for one of azimuth values or elevation values associated with the received target sound source angle, and one or more two-dimensional interpolating look-up tables specifying filter parameters for both azimuth and elevation values associated with the received target sound source angle.

The audio system applies 540 the configured audio TLDR to an audio signal received at a single audio channel to generate spatialized audio content for each channel of multiple channels (e.g., a left channel and a right channel). In embodiments where there may be additional audio channels, the audio system may apply 540 the configured audio TLDR to generate appropriate audio content for the additional audio channels.

The audio system presents 550 the generated spatialized audio content at multiple channels to a user via the headset.

Large-Scale Parametric Filter Fitting for HRTF Rendering

Conventional systems for approximating HRTFs attempt to determine a reduced set of filter parameters that can produce the desired frequency response for the HRTF from a single direction at a time. To approximate the HRTF for multiple directions, multiple different parameter reductions must be conducted. However, approximating the entire HRTF, which is a multi-valued function defined on a sphere, to a lower parameter space in a spatially consistent manner and that is consistent across HRTFs from individual users remain a challenge.

The HRTF is a multi-valued function on a sphere that is individualized to each user. An HRTF of a user contains redundant information/patterns. Furthermore, HRTFs of multiple users may contain similar functional information across them. Therefore, it is possible to approximate the HRTF of multiple users using low-complexity signal processing tools using parametric IIR/biquad filters (such as the audio TLDRs described in FIGS. 3-5).

In performing filter fitting for HRTF rendering, a conventional approach may be to initialize a set of filter parameters (e.g., the mean of all of the desired HRTFs to be fit), and then individually optimize the IIR filters to match the measured HRTFs at each position in the dataset. However, while HRTFs are measured at finite locations in space, they are continuous spherical functions with smoothly varying feature values. As a consequence, optimizing the filters to discrete locations in space can result in a loss of continuity and smoothly varying feature values across the spherical space. Conventional optimizations can therefore create issues when utilizing parametric HRTF models for real-time rendering because the interpolation of filter parameters from Point A to Point B may result in a parametric response that is not an approximation of the interpolation of the measured HRTF from Point A to Point B on the sphere. Furthermore, HRTFs have measured features that are semantically similar between individual people. For example, a peak or a notch for two users may provide similar perceptual cues but be located at different locations in frequency space and have different magnitudes.

Hence, while a sufficient number of cascaded IIR filters may be used to closely match a given frequency response, for an HRTF filter architecture to be generalizable, the filters used to approximate the HRTFs must behave in an analogous manner across space as well as across multiple users. Specifically, a given filter in this architecture must keep its basic identify/function across angles to be capable of changing smoothly across spherical space and it must play a similar role in the HRTF of different individuals to be capable of changing smoothly across users.

Embodiments described herein resolve these issues and reduce an entire HRTF to a lower parameter space in a spatially consistent way and in a way that is consistent across HRTFs from different users. The parameterized HRTFs may be then used to render spatialized audio content to users through the headset.

Embodiments described herein utilize neural networks to fit a large database of HRTFs with parametric filters in such a way that the filter parameters vary smoothly across space and behave analogously across different users. The fitting method relies on a neural network encoder (NNE), a differentiable decoder that utilizes digital signal processing solutions, and performing an optimization of the weights of the NNE using loss functions to generate a set of filters that fit across the database of HRTFs.

Figure 6:
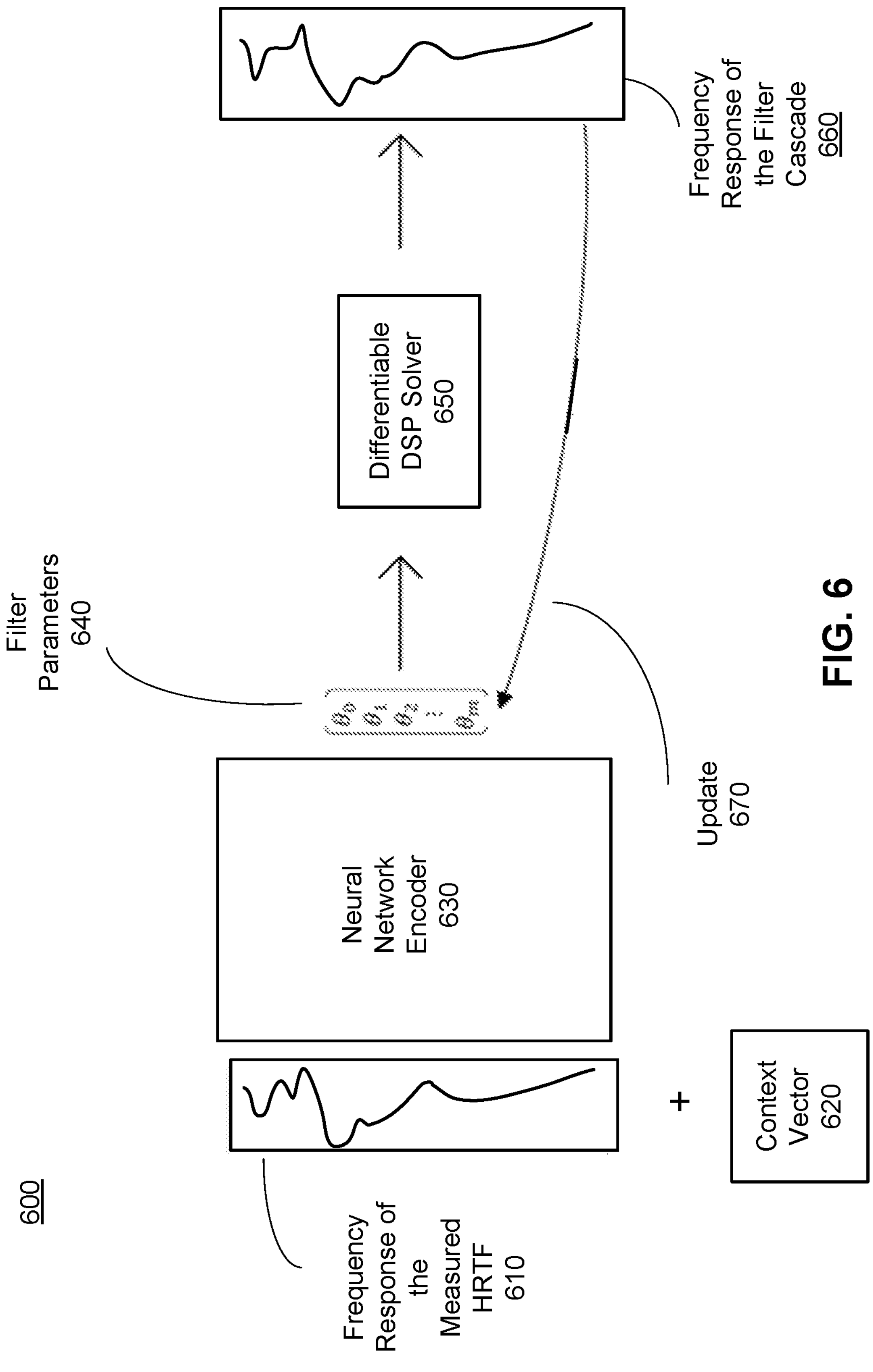
FIG. 6 is a depiction of a parametric filter fitting system for HRTF rendering, in accordance with one or more embodiments.

FIG. 6 depicts a parametric filter fitting system 600 for HRTF rendering in accordance with one or more embodiments. The system 600 receives a measured HRTF 610 with an associated context vector 620 from a data set of measured HRTFs in association with a set of context vectors. The context vector 620 may encode parameters such as: spatial location at which the HRTF is measured, anthropometric features values of an individual user, etc., among other parameters. The system provides the measured HRTF 610 along with the associated context vector 620 to a fully connected NNE 630. Weights associated with the NNE 630 are optimized to generate a low dimensional representation of the input HRTF. The low dimensional representation may be treated as the gain, center frequency, and Q of a set of biquad filters that are arranged in a cascade (e.g., similar to the audio TLDRs described in FIGS. 3-5), i.e., filter parameters 640. The system computes the frequency response 660 of the filter parameters 640. The system uses the computed response 660 of the filter parameters 640 to determine a loss based on the difference between the original frequency response of the measured HRTF 610 and the computed frequency response 660 of the filter parameters 650. The gradient of the loss function is back propagated using a differentiable digital signal processing (DSP) solver 650 to subsequently update the weights of the neural network encoder 630. The weight updates are computed using gradient descent methods based on the output of the loss function. Using HRTFs sampled from a large population of users and multiple directions simultaneously, the system optimizes the weights of the NNE 630 to generate filter parameters 640 that vary smoothly across space and consistently across users.

The parametric filter fitting system 600 and embodiments described herein allow for efficient fitting of large databases of HRTFs in a way that preserves spatial and intra-population characteristics. In addition, the system generalizes relatively well to unseen users. Furthermore, any number of additional context vectors may be appended to the frequency response to enable arbitrary levels of individualization. In some embodiments, the generated filter parameters are stored in the form of a model, such as look-up tables that may later be installed, downloaded, etc., onto the audio system from an external system (e.g., the parametric filter fitting system 870 in FIG. 8). In some embodiments, the model and/or look-up tables may be on the external system (e.g., the parametric filter fitting system 870 in FIG. 8) from which the audio system (e.g., audio system 200 in FIG. 2) requests the filter parameters.

Figure 7:
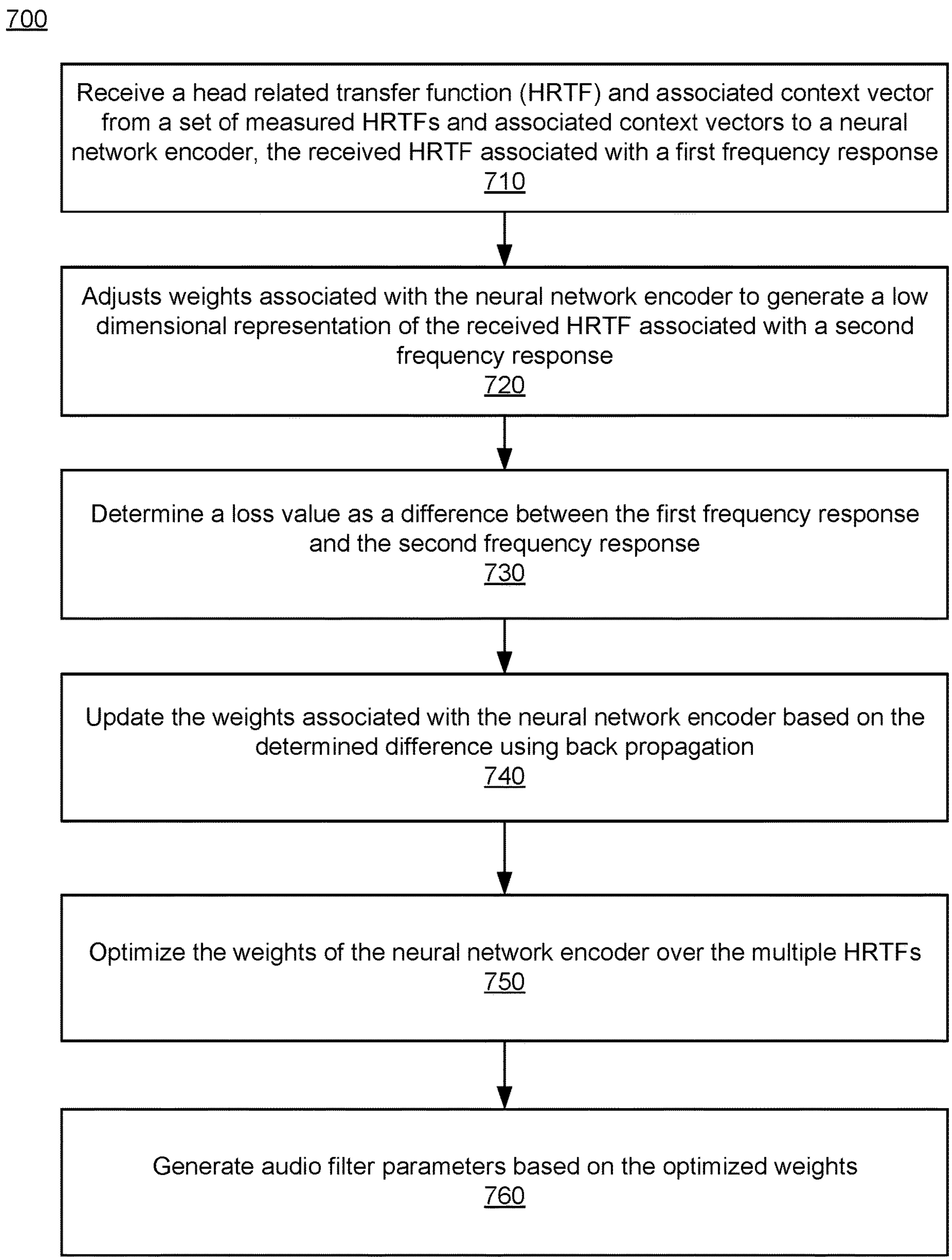
FIG. 7 is a flowchart illustrating a process for performing parametric filter fitting for HRTF rendering, in accordance with one or more embodiments.

FIG. 7 is a flowchart illustrating a process for performing parametric filter fitting for HRTF rendering, in accordance with one or more embodiments. The process shown in FIG. 7 may be performed by components of an external system (e.g., the parametric filter fitting system 600). Other entities may perform some or all of the steps in FIG. 7 in other embodiments. Embodiments may include different and/or additional steps or perform the steps in different orders.

The parametric filter fitting system receives 710 at a NNE, a measured HRTF with an associated context vector, where the measured HRTF is associated with a first frequency response. In some embodiments, the context vector may encode a spatial location of a sound source, such as azimuth and elevation values, as well as anthropometric features of a user, such as the distance between the ears, etc. The received HRTF is from a set of measured HRTFs and associated context vectors that may be measured for a large population of users (e.g., 100s of users).

The parametric filter fitting system adjusts 720 weights of the neural network encoder based on the received HRTF to generate a low dimensional representation of the received HRTF, the low dimensional representation associated with a second frequency response. In some embodiments, this low dimensional representation of the HRTF may be treated as the gain, center frequency, and Q of a set of biquad filters that are arranged in a cascade (e.g., similar to the audio TLDRs described in FIGS. 3-5).

The parametric filter fitting system determines 730 a loss function as a difference between the first and second frequency responses.

The parametric filter fitting system updates 740 the weights of the NNE based on the determined difference using back propagation of the gradient of the loss function. The back propagation computes the gradient of the loss function with respect to the weights of the NNE in order to update the weights. In some embodiments, the system performs the back propagation using a differential DSP solver.

The parametric filter fitting system determines 750 the weights of the neural network encoder over the set of measured HRTFs and associated context vectors that is measured over the large population of users to generate a set of weights, thereby generating filter parameters that vary smoothly across space and consistently across multiple users. In some embodiments, the parametric filter fitting system determines 750 the weights of the neural network encoder to be the optimal set of weights of the neural network encoder for the filter parameters to vary smoothly across space and consistently across users.

The parametric filter fitting system generates 760 and stores audio filter parameters based on the optimal set of weights. In some embodiments, the parametric filter fitting system may provide the optimal filter parameters to audio system upon request. In some embodiments, the HRTF optimization system may periodically update the weights of the neural network encoder based on measured HRTFs obtained from new populations of users and generate updated audio filter parameters. In some embodiments, the HRTF optimization system may periodically push the updated audio filter parameter values to the audio system.

Calibration System

In some embodiments, the data associated with the audio system described herein (e.g., the filter parameter model, the one-dimensional and two dimensional interpolating look-up tables, etc.) may be generated, updated, maintained, or some combination thereof, by a calibration system. The calibration system includes a means to present audio content to a user from various locations relative to the user. In some embodiments, the calibration system may include microphones in each ear canal to collect audio at each ear which was naturally present in the environment, emanating from the various locations. In this manner, the calibration system may determine true HRTFs for some angles for each of the users. In some embodiments, the calibration system may then extrapolate these measurements to provide individualization for all angles. In some embodiments, the calibration system may collect such information for a large population of users (e.g., 100s), to determine a set of average HRTFs that approximate true HRTFs for most users. In some embodiments, the calibration system may generate a model and/or look-up tables that map filter parameters for approximating the true HRTFs for various target positions (azimuth and/or elevation) relative to the user. In some embodiments, the calibration system may utilize user responses to synthetically generated sounds, explicitly indicating their apparent direction in space, or implicitly reacting to generated spatial audio. This information may be used to correct/tweak/warp the filter parameters over time to more closely reflect those that provide a realistic spatial percept to the user (i.e., may be closer to their true HRTF). In some embodiments, the model and/or look-up tables may later be installed, downloaded, etc., onto the audio system from an external server (e.g., the HRTF server 870 in FIG. 8). In some embodiments, the model and/or look-up tables may be on the external server (e.g., the HRTF server 870 in FIG. 8) from which the audio system (e.g., the TLDR configuration module 320 in FIG. 3) requests the filter parameters.

System

Figure 8:
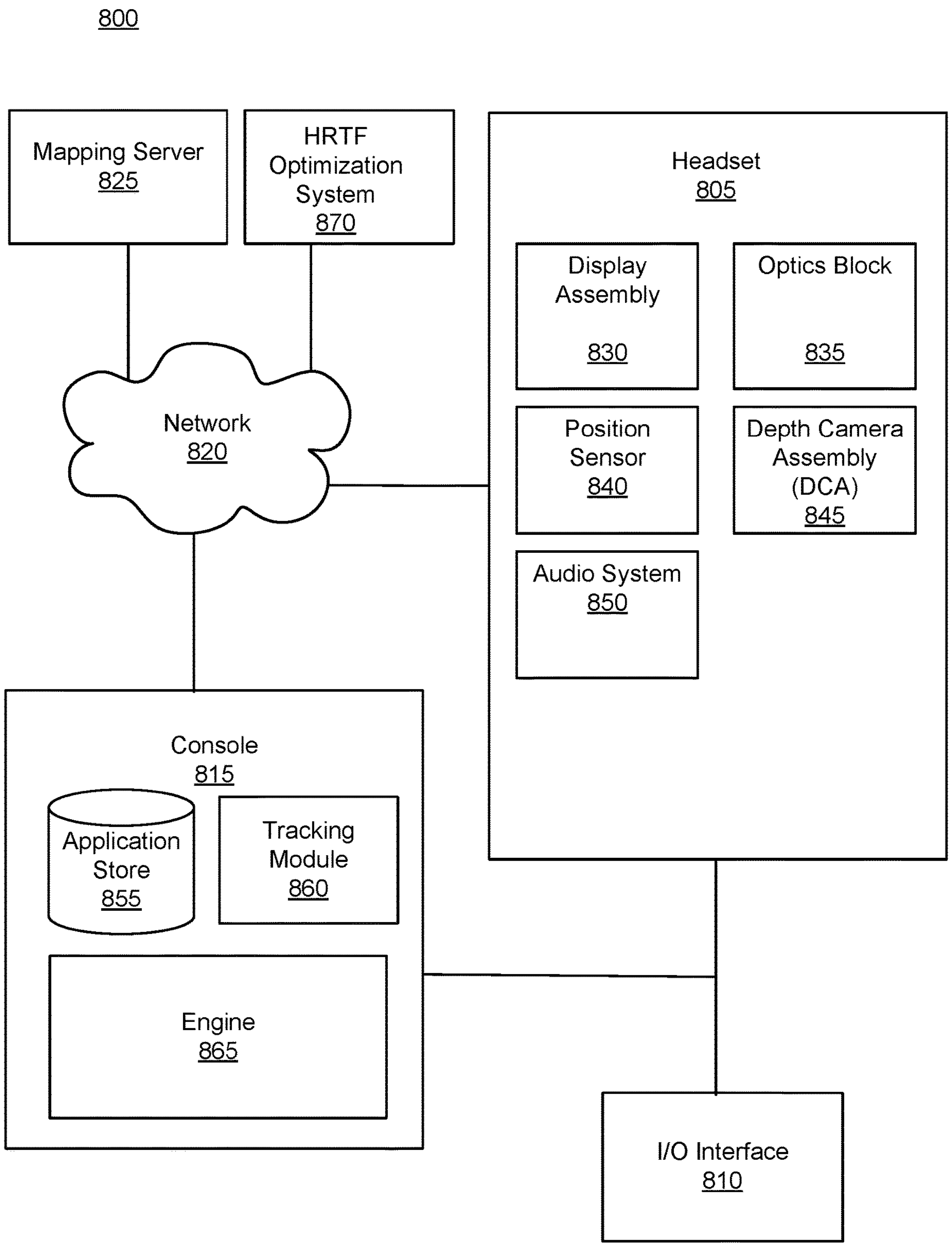
FIG. 8 depicts a block diagram of a system that includes a headset, in accordance with one or more embodiments.

FIG. 8 is a system 800 that includes a headset 805, in accordance with one or more embodiments. In some embodiments, the headset 805 may be the headset 100 of FIG. 1A or the headset 105 of FIG. 1B. The system 800 may operate in an artificial reality environment (e.g., a virtual reality environment, an augmented reality environment, a mixed reality environment, or some combination thereof). The system 800 shown by FIG. 8 includes the headset 805, an input/output (I/O) interface 810 that is coupled to a console 815, the network 820, and the mapping server 825. While FIG. 8 shows an example system 800 including one headset 805 and one I/O interface 810, in other embodiments any number of these components may be included in the system 800. For example, there may be multiple headsets each having an associated I/O interface 810, with each headset and I/O interface 810 communicating with the console 815. In alternative configurations, different and/or additional components may be included in the system 800. Additionally, functionality described in conjunction with one or more of the components shown in FIG. 8 may be distributed among the components in a different manner than described in conjunction with FIG. 8 in some embodiments. For example, some or all of the functionality of the console 815 may be provided by the headset 805.

The headset 805 includes the display assembly 830, an optics block 835, one or more position sensors 840, and the DCA 845. Some embodiments of headset 805 have different components than those described in conjunction with FIG. 8. Additionally, the functionality provided by various components described in conjunction with FIG. 8 may be differently distributed among the components of the headset 805 in other embodiments, or be captured in separate assemblies remote from the headset 805.

The display assembly 830 displays content to the user in accordance with data received from the console 815. The display assembly 830 displays the content using one or more display elements (e.g., the display elements 120). A display element may be, e.g., an electronic display. In various embodiments, the display assembly 830 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 120 may also include some or all of the functionality of the optics block 835.

The optics block 835 may magnify image light received from the electronic display, corrects optical errors associated with the image light, and presents the corrected image light to one or both eyeboxes of the headset 805. In various embodiments, the optics block 835 includes one or more optical elements. Example optical elements included in the optics block 835 include: an aperture, a Fresnel lens, a convex lens, a concave lens, a filter, a reflecting surface, or any other suitable optical element that affects image light. Moreover, the optics block 835 may include combinations of different optical elements. In some embodiments, one or more of the optical elements in the optics block 835 may have one or more coatings, such as partially reflective or anti-reflective coatings.

Magnification and focusing of the image light by the optics block 835 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 835 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 835 corrects the distortion when it receives image light from the electronic display generated based on the content.

The position sensor 840 is an electronic device that generates data indicating a position of the headset 805. The position sensor 840 generates one or more measurement signals in response to motion of the headset 805. The position sensor 190 is an embodiment of the position sensor 840. Examples of a position sensor 840 include: one or more IMUs, one or more accelerometers, one or more gyroscopes, one or more magnetometers, another suitable type of sensor that detects motion, or some combination thereof. The position sensor 840 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 805 from the sampled data. For example, the IMU integrates the measurement signals received from the accelerometers over time to estimate a velocity vector and integrates the velocity vector over time to determine an estimated position of a reference point on the headset 805. The reference point is a point that may be used to describe the position of the headset 805. While the reference point may generally be defined as a point in space, however, in practice the reference point is defined as a point within the headset 805.

The DCA 845 generates depth information for a portion of the local area. The DCA includes one or more imaging devices and a DCA controller. The DCA 845 may also include an illuminator. Operation and structure of the DCA 845 is described above with regard to FIG. 1A.

The audio system 850 provides audio content to a user of the headset 805. The audio system 850 is substantially the same as the audio system 200 describe above. The audio system 850 may comprise one or acoustic sensors, one or more transducers, and an audio controller. The audio system 850 may provide spatialized audio content to the user. In some embodiments, the audio system 850 may request acoustic parameters from the mapping server 825 over the network 820. The acoustic parameters describe one or more acoustic properties (e.g., room impulse response, a reverberation time, a reverberation level, etc.) of the local area. The audio system 850 may provide information describing at least a portion of the local area from e.g., the DCA 845 and/or location information for the headset 805 from the position sensor 840. The audio system 850 may generate one or more sound filters using one or more of the acoustic parameters received from the mapping server 825 and use the sound filters to provide audio content to the user. In some embodiments, the audio system performs parametric selection of a suitable audio time and level difference renderer (TLDR) for generating spatialized audio content. The system may use input parameters to select an audio TLDR from a set of possible audio TLDRs for generating spatialized audio content from a single channel input audio signal (e.g., mono-channel). A selected audio TLDR may be configured using use static and dynamic monaural and binaural filters and delays to simulate applying an approximation of a given HRTF to an input audio signal. The audio system uses the selected and configured audio TLDR to generate multi-channel spatialized audio content for presenting to the user via the headset. Various audio TLDRs may provide varying levels of accuracy in approximating the given HRTF. In some embodiments, the input parameters used for selecting and configuring an audio TLDR may include target device metrics such as a target power consumption, target compute load, etc., and/or a target level of accuracy in approximating an HRTF.

The I/O interface 810 is a device that allows a user to send action requests and receive responses from the console 815. An action request is a request to perform a particular action. For example, an action request may be an instruction to start or end capture of image or video data, or an instruction to perform a particular action within an application. The I/O interface 810 may include one or more input devices. Example input devices include: a keyboard, a mouse, a game controller, or any other suitable device for receiving action requests and communicating the action requests to the console 815. An action request received by the I/O interface 810 is communicated to the console 815, which performs an action corresponding to the action request. In some embodiments, the I/O interface 810 includes an IMU that captures calibration data indicating an estimated position of the I/O interface 810 relative to an initial position of the I/O interface 810. In some embodiments, the I/O interface 810 may provide haptic feedback to the user in accordance with instructions received from the console 815. For example, haptic feedback is provided when an action request is received, or the console 815 communicates instructions to the I/O interface 810 causing the I/O interface 810 to generate haptic feedback when the console 815 performs an action.

The console 815 provides content to the headset 805 for processing in accordance with information received from one or more of: the DCA 845, the headset 805, and the I/O interface 810. In the example shown in FIG. 8, the console 815 includes an application store 855, a tracking module 860, and an engine 865. Some embodiments of the console 815 have different modules or components than those described in conjunction with FIG. 8. Similarly, the functions further described below may be distributed among components of the console 815 in a different manner than described in conjunction with FIG. 8. In some embodiments, the functionality discussed herein with respect to the console 815 may be implemented in the headset 805, or a remote system.

The application store 855 stores one or more applications for execution by the console 815. An application is a group of instructions, that when executed by a processor, generates content for presentation to the user. Content generated by an application may be in response to inputs received from the user via movement of the headset 805 or the I/O interface 810. Examples of applications include: gaming applications, conferencing applications, video playback applications, or other suitable applications.

The tracking module 860 tracks movements of the headset 805 or of the I/O interface 810 using information from the DCA 845, the one or more position sensors 840, or some combination thereof. For example, the tracking module 860 determines a position of a reference point of the headset 805 in a mapping of a local area based on information from the headset 805. The tracking module 860 may also determine positions of an object or virtual object. Additionally, in some embodiments, the tracking module 860 may use portions of data indicating a position of the headset 805 from the position sensor 840 as well as representations of the local area from the DCA 845 to predict a future location of the headset 805. The tracking module 860 provides the estimated or predicted future position of the headset 805 or the I/O interface 810 to the engine 865.

The engine 865 executes applications and receives position information, acceleration information, velocity information, predicted future positions, or some combination thereof, of the headset 805 from the tracking module 860. Based on the received information, the engine 865 determines content to provide to the headset 805 for presentation to the user. For example, if the received information indicates that the user has looked to the left, the engine 865 generates content for the headset 805 that mirrors the user's movement in a virtual local area or in a local area augmenting the local area with additional content. Additionally, the engine 865 performs an action within an application executing on the console 815 in response to an action request received from the I/O interface 810 and provides feedback to the user that the action was performed. The provided feedback may be visual or audible feedback via the headset 805 or haptic feedback via the I/O interface 810.

The network 820 couples the headset 805 and/or the console 815 to the mapping server 825. The network 820 may include any combination of local area and/or wide area networks using both wireless and/or wired communication systems. For example, the network 820 may include the Internet, as well as mobile telephone networks. In one embodiment, the network 820 uses standard communications technologies and/or protocols. Hence, the network 820 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 820 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 820 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 825 may include a database that stores a virtual model describing a plurality of spaces, wherein one location in the virtual model corresponds to a current configuration of a local area of the headset 805. The mapping server 825 receives, from the headset 805 via the network 820, information describing at least a portion of the local area and/or location information for the local area. The user may adjust privacy settings to allow or prevent the headset 805 from transmitting information to the mapping server 825. The mapping server 825 determines, based on the received information and/or location information, a location in the virtual model that is associated with the local area of the headset 805. The mapping server 825 determines (e.g., retrieves) one or more acoustic parameters associated with the local area, based in part on the determined location in the virtual model and any acoustic parameters associated with the determined location. The mapping server 825 may transmit the location of the local area and any values of acoustic parameters associated with the local area to the headset 805.

The parametric filter fitting system 870 for HRTF rendering may utilize neural networks to fit a large database of measured HRTFs obtained from a population of users with parametric filters. The filters are determined in such a way that the filter parameters vary smoothly across space and behave analogously across different users. The fitting method relies on a neural network encoder, a differentiable decoder that utilizes digital signal processing solutions, and performing an optimization of the weights of the neural network encoder using loss functions to generate one or more models of filter parameters that fit across the database of HRTFs. The system 870 may provide the filter parameter models periodically, or upon request to audio system 850 for use in generating spatialized audio content for presentation to a user of the headset 805. In some embodiments, the provided filter parameter models are stored in the data store of the audio system 850.

One or more components of system 800 may contain a privacy module that stores one or more privacy settings for user data elements. The user data elements describe the user or the headset 805. For example, the user data elements may describe a physical characteristic of the user, an action performed by the user, a location of the user of the headset 805, a location of the headset 805, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 800 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed.

Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:

configuring an audio time and level difference renderer (TLDR) based on one or more received input parameters using a filter parameter model that includes a set of configured binaural dynamic filters, wherein the binaural dynamic filters in the set are coupled via multiple channels for receiving input audio signals that are spilt from a single channel; and applying the configured audio TLDR to an audio signal to generate spatialized audio content for each channel of the multiple channels, wherein the generated spatialized audio content is presented via multiple channels to a user.

2. The method of claim 1, wherein the configured audio TLDR further comprises:

a set of configured monaural static filters, wherein the monaural static filters in the set of configured monaural static filters are each coupled via the single channel for receiving an input audio signal; and a set of configured monaural dynamic filters, wherein the monaural dynamic filters in the set of configured monaural dynamic filters are each coupled via the single channel for receiving an input audio signal.

3. The method of claim 2, wherein the audio signal is received via a single channel, and applying the configured audio TLDR to the audio signal to generate spatialized audio content for each channel of the multiple channels comprises:

processing the audio signal received at the single channel using the set of configured monaural static filters and the set of configured monaural dynamic filters to generate a modified audio signal at the single channel;

splitting the modified audio signal at the single channel into modified audio signals at the multiple channels; and processing the modified audio signals at the multiple channels using the set of configured binaural dynamic filters to generate the spatialized audio content for each channel of the multiple channels.

4. The method of claim 1, wherein the one or more received input parameters comprises a target fidelity of audio content rendering, the target fidelity of audio content rendering further comprising one or more of: a target frequency response for the generated spatialized audio content and a target signal to noise ratio for the generated spatialized audio content.

5. The method of claim 1, wherein the received one or more input parameters comprises one or more of:

a target power consumption of the audio TLDR;

a target compute load specification in association with the audio TLDR;

a target memory footprint in association with the audio TLDR; and a target level of accuracy in approximating a given head related transfer function (HRTF).

6. The method of claim 1, wherein the one or more received input parameters comprises a target sound source angle, the target sound source angle further comprising one or more of: an azimuth parameter value and an elevation parameter value.

7. The method of claim 1, further comprising:

selecting the audio time and level difference renderer TLDR from a set of one or more audio TLDRs based on the one or more received input parameters.

8. An audio controller configured to:

configure an audio time and level difference renderer (TLDR) based on one or more received input parameters using a filter parameter model that includes a set of configured binaural dynamic filters, wherein the binaural dynamic filters in the set are coupled via multiple channels for receiving input audio signals that are spilt from a single channel; and apply the configured audio TLDR to an audio signal to generate spatialized audio content for each channel of the multiple channels, wherein a transducer array is configured to present the generated spatialized audio content via multiple channels to a user.

9. The audio controller of claim 8, wherein the configured audio TLDR comprises:

a set of configured monaural static filters, wherein the monaural static filters in the set of configured monaural static filters are each coupled via the single channel for receiving an input audio signal; and a set of configured monaural dynamic filters, wherein the monaural dynamic filters in the set of configured monaural dynamic filters are each coupled via the single channel for receiving an input audio signal.

10. The audio controller of claim 9, wherein the one or more received input parameters comprises a target sound source angle, the target sound source angle further comprising one or more of: an azimuth parameter value and an elevation parameter value.

11. The audio controller of claim 10, wherein the filter parameter model comprises:

one or more one-dimensional look-up tables specifying filter parameter values for at least one of: the azimuth parameter value or the elevation parameter value associated with the target sound source angle; and one or more two-dimensional look-up tables specifying filter parameters for the azimuth parameter value and the elevation parameter value associated with the target sound source angle.

12. The audio controller of claim 11, wherein the configured audio TLDR further comprises:

one configured binaural dynamic filter for each channel of the multiple channels in the set of configured binaural dynamic filters, each configured binaural dynamic filter based on a look-up table from the one or more one-dimensional look-up tables for generating filter parameter values based on the target sound source angle; and a configured delay between the multiple channels based on a one-dimensional look-up table.

13. The audio controller of claim 11, wherein the configured audio TLDR further comprises:

two configured monaural scalar gain filters in the set of configured monaural static filters;

three configured binaural dynamic filters for each channel of the multiple channels in the set of configured binaural dynamic filters, each configured binaural dynamic filter based on a look-up table from the one or more two-dimensional look-up tables for generating filter parameter values based on the target sound source angle; and a configured delay between the multiple audio channels based on a one-dimensional look-up table.

14. The audio controller of claim 11, wherein the configured audio TLDR further comprises:

six configured binaural dynamic filters for each channel of the multiple channels in the set of configured binaural dynamic filters, each configured binaural dynamic filter based on a look-up table from the one or more two-dimensional look-up tables for generating filter parameter values based on the target sound source angle; and a configured delay between the multiple channels based a one-dimensional look-up table.

15. The audio controller of claim 8, further configured to:

process the audio signal at the single channel using the set of configured monaural static filters and the set of configured monaural dynamic filters to generate a modified audio signal at the single channel;

split the modified audio signal at the single channel into modified audio signals at the multiple channels; and process the modified audio signals at the multiple channels using the set of configured binaural dynamic filters to generate the spatialized audio content for each channel of the multiple channels.

16. The audio controller of claim 8, wherein the one or more received input parameters comprises a target fidelity of audio content rendering, the target fidelity of audio content rendering further comprising one or more of: a target frequency response for the generated spatialized audio content and a target signal to noise ratio for the generated spatialized audio content.

17. The audio controller of claim 8, wherein the one or more received input parameters comprises one or more of:

a target power consumption of the configured audio TLDR;

a target compute load specification in association with the configured audio TLDR;

a target memory footprint in association with the configured audio TLDR; and a target level of accuracy in approximating a given head related transfer function (HRTF).

18. A non-transitory computer-readable storage medium comprising stored instructions, the instructions when executed by a processor of a device, causing the device to:

configure an audio time and level difference renderer (TLDR) based on one or more input parameters using a filter parameter model that includes a set of configured binaural dynamic filters, wherein the binaural dynamic filters in the set are coupled via multiple channels for receiving input audio signals that are spilt from a single channel; and apply the configured audio TLDR to an audio signal to generate spatialized audio content for each channel of the multiple channels, wherein the generated spatialized audio content is presented via multiple channels to a user.

19. The non-transitory computer-readable storage medium of claim 18, wherein the configured audio TLDR further comprises:

a set of configured monaural static filters, wherein the monaural static filters in the set of configured monaural static filters are each coupled via the single channel for receiving an input audio signal; and a set of configured monaural dynamic filters, wherein the monaural dynamic filters in the set of configured monaural dynamic filters are each coupled via the single channel for receiving an input audio signal.

20. The non-transitory computer-readable storage medium of claim 18, wherein the one or more input parameters comprises a target sound source angle, the target sound source angle further comprising one or more of: an azimuth parameter value and an elevation parameter value.

* * * * *